United States Patent
Maeo

(10) Patent No.: US 11,301,189 B2
(45) Date of Patent: Apr. 12, 2022

(54) IMAGE PROCESSING APPARATUS, IMAGE PROCESSING METHOD, AND NON-TRANSITORY COMPUTER-READABLE STORAGE MEDIUM

(71) Applicant: Yukiko Maeo, Kanagawa (JP)

(72) Inventor: Yukiko Maeo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/305,085

(22) Filed: Jun. 30, 2021

(65) Prior Publication Data
US 2022/0019392 A1    Jan. 20, 2022

(30) Foreign Application Priority Data

Jul. 15, 2020  (JP) .............. JP2020-121530
Mar. 5, 2021  (JP) .............. JP2021-035837

(51) Int. Cl.
*G06F 3/12*  (2006.01)
*G06K 15/00*  (2006.01)

(52) U.S. Cl.
CPC .......... *G06F 3/1255* (2013.01); *G06F 3/1204* (2013.01); *G06F 3/1273* (2013.01); *G06K 15/407* (2013.01)

(58) Field of Classification Search
CPC ... G06K 15/407; G06F 3/1273; G06F 3/1255; G06F 3/1204; G06F 3/1219; G03G 15/0121; H04N 1/6038; H04N 1/6008
See application file for complete search history.

(56) References Cited

U.S. PATENT DOCUMENTS

| | | | |
|---|---|---|---|
| 9,706,085 B1* | 7/2017 | Lin | H04N 1/6066 |
| 2009/0147313 A1 | 6/2009 | Miyagi et al. | |
| 2009/0168108 A1 | 7/2009 | Matsushima | |
| 2009/0285612 A1 | 11/2009 | Matsushima | |
| 2018/0270396 A1* | 9/2018 | Das | G06F 3/1298 |
| 2019/0260912 A1 | 8/2019 | Matsushima | |
| 2021/0029270 A1 | 1/2021 | Matsushima | |
| 2022/0004953 A1* | 1/2022 | Halford | H04N 1/54 |

FOREIGN PATENT DOCUMENTS

JP    2012-004749    1/2012

* cited by examiner

*Primary Examiner* — Iriana Cruz
(74) *Attorney, Agent, or Firm* — IPUSA, PLLC

(57) ABSTRACT

An image processing apparatus includes circuitry. The circuitry acquires colorant set information indicating at least one colorant set that reproduces a spot color. The circuitry classifies, according to colorant mounting information indicating a colorant mounted on an image forming apparatus, the at least one colorant set into first and second colorant sets. The spot color is reproduceable with the first colorant set without a replacement of the colorant mounted on the image forming apparatus. The spot color is reproduceable with the second colorant set with a replacement of the colorant mounted on the image forming apparatus. The circuitry displays the at least one colorant set on a display on which the at least one colorant set is identifiable as one of the first colorant set and the second colorant set. The circuitry receives a selection of the first colorant set that is used to reproduce the spot color.

9 Claims, 19 Drawing Sheets

FIG. 7

```
┌─────────────────────────────────────────────┐ ─700
│ EDIT SPOT COLOR                             │
├─────────────────────────────────────────────┤
│                                         701 │
│   ▼SPOT COLOR INFORMATION                   │
│      SPOT COLOR DICTIONARY: R Color Book Coated
│      SPOT COLOR NAME: Vivid Red             │
│            LAB VALUE: (74.2, 65.0, 35.9)    │
│                                             │
│   ▼MOUNTED COLORANT SET                     │
│       (K)(C)(M)(Y)(NeP)(Red)       702      │
│                                             │
│                                         703 │
│   ▼SELECTION OF COLORANT SET                │
│   ┌ ─ ─ ─ ─ ─ ─ ─ ─ ─ ─ ─ ─ ─ ─ ─ ─ ─ ─ ─ ┐ │
│     ○ (K)(C)(M)(Y)         K: 0, C: 0, M: 74, Y: 53
│     ○ (K)(C)(M)(Y)(NeP)    K: 0, C: 0, M: 0, Y: 45, NeP: 60
│     ⦿ (K)(C)(M)(Y)(Red)    K: 0, C: 0, M: 10, Y: 0, Red: 70
│   └ ─ ─ ─ ─ ─ ─ ─ ─ ─ ─ ─ ─ ─ ─ ─ ─ ─ ─ ─ ┘ │
│                                         704 │
│   ▼CHANGE OF DEVICE VALUE                   │
│    K[ 0 ] C[ 0 ] M[ 10 ] Y[ 0 ] NeP[ 0 ] Red[ 70 ]
│                                             │
│                    ┌─705──┐                 │
│                    │  OK  │                 │
│                    └──────┘                 │
└─────────────────────────────────────────────┘
```

FIG. 8

```
┌─────────────────────────────────────────────────┐ ─700
│ EDIT SPOT COLOR                                 │
├─────────────────────────────────────────────────┤
│                                          ─701   │
│   ▼SPOT COLOR INFORMATION                       │
│       SPOT COLOR DICTIONARY: R Color Book Coated│
│       SPOT COLOR NAME: Vivid Red                │
│               LAB VALUE: (74.2, 65.0, 35.9)     │
│                                                 │
│   ▼MOUNTED COLORANT SET                         │
│       (K)(C)(M)(Y)(NeP)         ─702            │
│                                                 │
│   ▼SELECTION OF COLORANT SET     ─703           │
│   ┌ ─ ─ ─ ─ ─ ─ ─ ─ ─ ─ ─ ─ ─ ─ ─ ─ ─ ─ ─ ─ ─ ┐ │
│   │ ○ (K)(C)(M)(Y)        K: 0, C: 0, M: 74, Y: 53 │
│   │ ◉ (K)(C)(M)(Y)(NeP)   K: 0, C: 0, M: 0, Y: 45, NeP: 60 │
│   │ ★◎(K)(C)(M)(Y)(Red)  K: 0, C: 0, M: 10, Y: 0, Red: 70 │
│   └ ─ ─ ─ ─ ─ ─ ─ ─ ─ ─ ─ ─ ─ ─ ─ ─ ─ ─ ─ ─ ─ ┘ │
│                                                 │
│   ▼CHANGE OF DEVICE VALUE        ─704           │
│     K [ 0 ]  C [ 0 ]  M [ 0 ]  Y [ 45 ] NeP [ 60 ] │
│                                                 │
│                            ─705                 │
│                          [  OK  ]               │
└─────────────────────────────────────────────────┘
```

FIG. 10A  FIG. 10 | FIG. 10A | FIG. 10B |
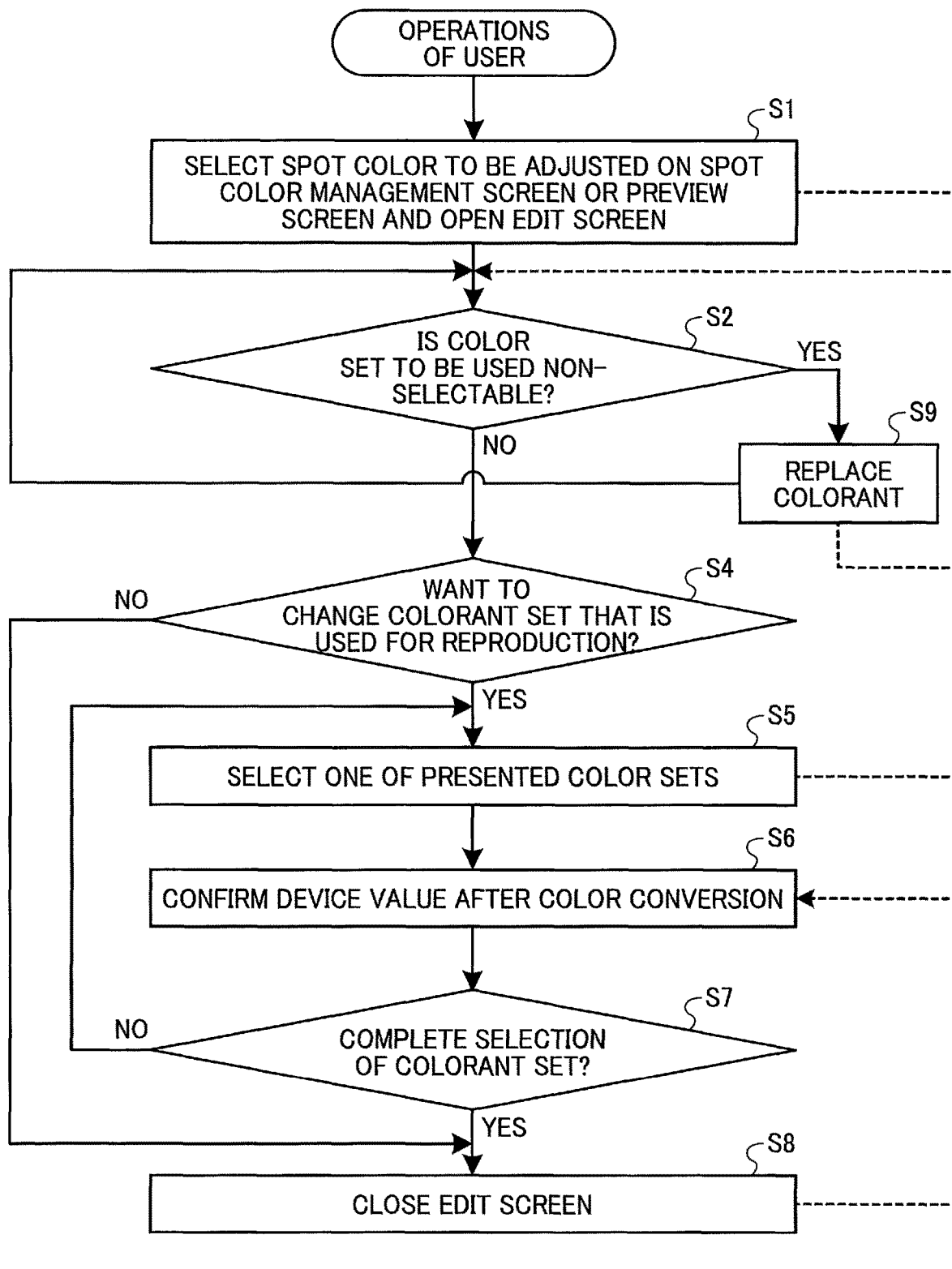

FIG. 13

EDIT SPOT COLOR — 700

▼ SPOT COLOR INFORMATION — 701
  SPOT COLOR DICTIONARY: R Color Book Coated
  SPOT COLOR NAME: Vivid Red
  LAB VALUE: (74.2, 65.0, 35.9)

▼ MOUNTED COLORANT SET — 702
  K C M Y Red

▼ COLORANT AMOUNT — X3
  K: 98%, C: 25%, M: 45%, Y: 10%, Red: 20%

▼ SELECTION OF COLORANT SET — 703

| COLORANT SET | DEVICE VALUE | PAY ATTENTION TO RESIDUAL AMOUNT (X4) |
|---|---|---|
| ○ K C M Y | K: 0, C: 0, M: 74, Y: 53 | Y: 10% |
| ○ K C M Y NeP | K: 0, C: 0, M: 0, Y: 45, NeP: 60 | Y: 10%, Np: 14% |
| ◉ K C M Y Red | K: 0, C: 0, M: 10, Y: 0, Red: 70 | — |

▼ CHANGE OF DEVICE VALUE — 704
  K [0]  C [0]  M [10]  Y [0]  Red [70]

EDIT SPOT COLOR

▼SPOT COLOR INFORMATION  701
   SPOT COLOR DICTIONARY: R Color Book Coated
   SPOT COLOR NAME: Vivid Red
       LAB VALUE: (74.2, 65.0, 35.9)

▼MOUNTED COLORANT SET  702
   (K)(C)(M)(Y)(NeP)

▼SELECTION OF COLORANT SET  703

| COLORANT SET | DEVICE VALUE | COLOR REPRODUCIBILITY |
|---|---|---|
| ○ (K)(C)(M)(Y) | K: 0, C: 0, M: 74, Y: 53 | 1 ② 3 4 5 |
| ◉ (K)(C)(M)(Y)(NeP) | K: 0, C: 0, M: 0, Y: 45, NeP: 60 | 1 2 3 ④ 5 |
| ★ (K)(C)(M)(Y)(Red) | K: 0, C: 0, M: 10, Y: 0, Red: 70 | 1 2 3 4 ⑤ |

X5

▼CHANGE OF DEVICE VALUE  704
  K [ 0 ]  C [ 0 ]  M [ 0 ]  Y [ 45 ]  NeP [ 60 ]

EDIT SPOT COLOR — 700

▼ SPOT COLOR INFORMATION — 701
　　SPOT COLOR DICTIONARY: R Color Book Coated
　　SPOT COLOR NAME: Vivid Red
　　　　LAB VALUE: (74.2, 65.0, 35.9)

▼ MOUNTED COLORANT SET — 702
　　Ⓚ Ⓒ Ⓜ Ⓨ (NeP)

▼ SELECTION OF COLORANT SET — 703

| | COLORANT SET | DEVICE VALUE |
|---|---|---|
| ○ | Ⓚ Ⓒ Ⓜ Ⓨ | K: 0, C: 0, M: 74, Y: 53 |
| ◉ | Ⓚ Ⓒ Ⓜ Ⓨ (NeP) | K: 0, C: 0, M: 0, Y: 45, NeP: 60 |
| ★ ○ | Ⓚ Ⓒ Ⓜ Ⓨ (Red) | K: 0, C: 0, M: 10, Y: 0, Red: 70 |

▼ CHANGE OF DEVICE VALUE — 704
　K [0]　C [0]　M [0]　Y [45]　NeP [60]

▼ USAGE HISTORY — X6

| DATE (AND TIME) | DATA NAME | COLORANT SET | DEVICE VALUE | SIMULTANEOUSLY USED COLORS |
|---|---|---|---|---|
| 2021/01/30 | Greetings_w_v2.pdf | KCMYNP | 0, 0, 0, 45, 60 | R Vivid Pink, R Purple |
| 2021/01/19 | 5kdhs0001.pdf | KCMYR | 0, 0, 13, 0, 70 | — |
| 2020/12/14 | Greetings_w_v1.pdf | KCMYNP | 0, 0, 0, 45, 60 | R Vivid Pink, R Purple |

[ OK ] — 705

ND NON-TRANSITORY COMPUTER-READABLE STORAGE MEDIUM

IMAGE PROCESSING APPARATUS, IMAGE PROCESSING METHOD, AND NON-TRANSITORY COMPUTER-READABLE STORAGE MEDIUM

CROSS-REFERENCE TO RELATED APPLICATIONS

This patent application is based on and claims priority pursuant to 35 U.S.C. § 119(a) to Japanese Patent Application Nos. 2020-121530, filed on Jul. 15, 2020, and 2021-035837, filed on Mar. 5, 2021, in the Japan Patent Office, the entire disclosure of each of which is hereby incorporated by reference herein.

BACKGROUND

Technical Field

Embodiments of the present disclosure relate to an image processing apparatus, an image processing method, and a non-transitory computer-readable storage medium storing program code that causes a computer to perform the image processing method.

Related Art

There is a developed technique of determining a combination of colorants that are used to reproduce a spot color with a process color colorant and a colorant other than the process color colorant.

SUMMARY

In one embodiment of the present disclosure, a novel image processing apparatus includes circuitry. The circuitry is configured to acquire, for a spot color that is reproduced with at least one of a process color colorant and a colorant different from the process color colorant, colorant set information indicating at least one colorant set that reproduces the spot color. The circuitry is configured to classify, according to colorant mounting information indicating a colorant mounted on an image forming apparatus, the at least one colorant set into a first colorant set and a second colorant set. The first colorant set is a colorant set with which the spot color is reproduceable without a replacement of the colorant mounted on the image forming apparatus. The second colorant set is a colorant set with which the spot color is reproduceable with a replacement of the colorant mounted on the image forming apparatus. The circuitry is configured to display the at least one colorant set on a display on which the at least one colorant set is identifiable as one of the first colorant set and the second colorant set. The circuitry is configured to receive a selection of the first colorant set that is used to reproduce the spot color.

Also described are novel image processing method and non-transitory, computer-readable storage medium storing computer-readable program code that causes a computer to perform the image processing method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a diagram illustrating an example of an edit screen generated in the DFE according to the first embodiment;

FIG. 8 is a diagram illustrating another example of the edit screen generated in the DFE according to the first embodiment;

FIG. 10 including FIG. 10A

FIG. 13 is a diagram illustrating an example of an edit screen generated in the DFE according to the second embodiment;

FIG. 14 is a diagram illustrating an example of an edit screen generated in a DFE according to a third embodiment;

FIG. 16 is a diagram illustrating an example of an edit screen generated in the DFE according to the fourth embodiment.

Figure 1:
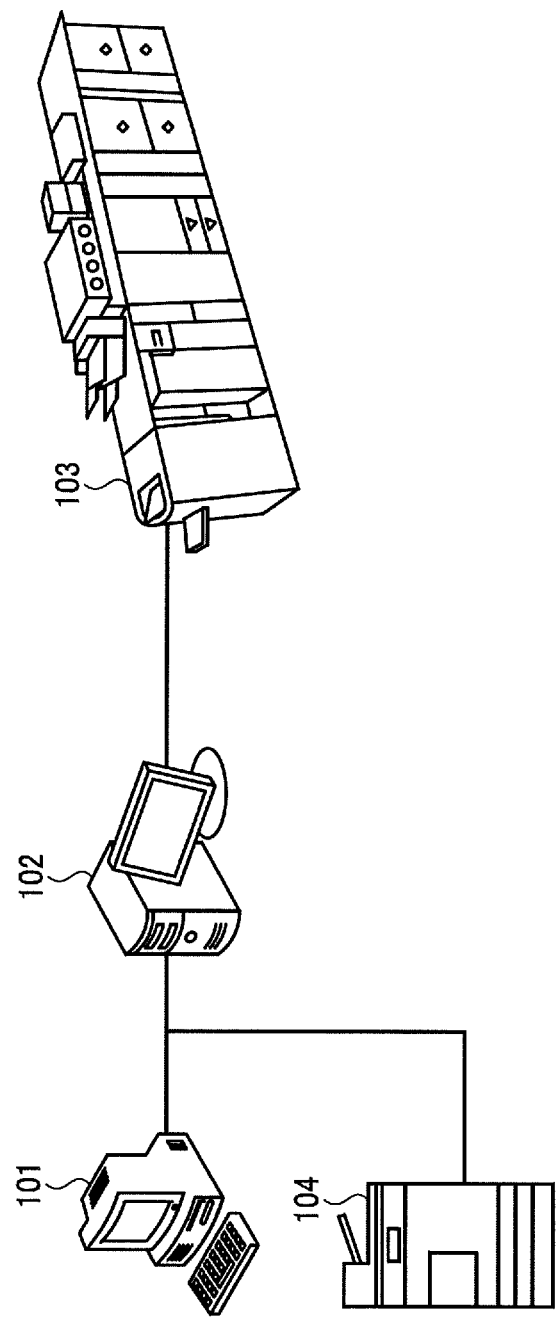
FIG. 1 is a diagram illustrating an example of a configuration of an image processing system according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

It is to be noted that, in the following description, suffixes Y, M, C, and K denote colors of yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below.

Now, a description is given of a first embodiment of the present disclosure.

FIG. 1 is a diagram illustrating an example of a configuration of an image processing system according to the first embodiment.

The image processing system according to the present embodiment includes a client personal computer (PC) 101, a digital front end (DFE) 102, an image forming apparatus 103, and a management server 104.

The client PC 101 includes a display such as a liquid crystal display and an input device such as a mouse or a keyboard. The client PC 101 generates a print job according to a request from a user. The client PC 101 transmits the generated print job to the DFE 102 or the management server 104.

The DFE 102 receives the print job from the client PC 101 or the management server 104. The DFE 102 generates drawing data with a raster image processor (RIP) engine according to the received print job. The DFE 102 transmits the generated drawing data to the image forming apparatus 103. The DFE 102 displays an operation screen of the DFE 102 (e.g., an edit screen described later) on a display of the DFE 102 or on a control panel of the image forming apparatus 103, for example.

The image forming apparatus 103 forms an image on a recording medium such as a sheet of paper according to the drawing data received from the DFE 102.

The management server 104 manages (or stores) the print job received from the client PC 101. The management server 104 transmits the print job to the DFE 102 in response to a request from the DFE 102.

Figure 2:
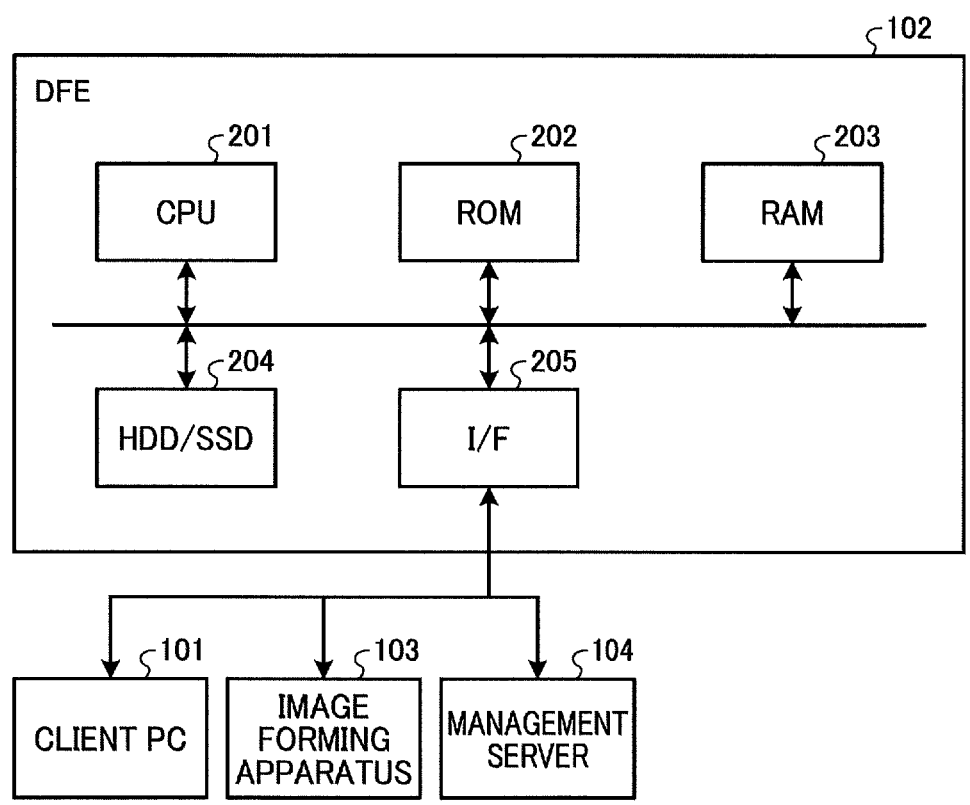
FIG. 2 is a diagram illustrating an example of a hardware configuration of a digital front end (DFE) included in the image processing system according to the first embodiment.

Referring now to FIG. 2, a description is given of a hardware configuration of the DFE 102 according to the present embodiment.

FIG. 2 is a diagram illustrating an example of the hardware configuration of the DFE 102 included in the image processing system according to the first embodiment.

As illustrated in FIG. 2, the DFE 102 according to the present embodiment includes a central processing unit (CPU) 201, a read only memory (ROM) 202, a random access memory (RAM) 203, a hard disk drive/solid state drive (HDD/SSD) 204, and an interface (I/F) 205.

The CPU 201 uses the RAM 203 as a work area to execute a program stored in the ROM 202.

The HDD/SSD 204 is a storage device that stores various kinds of information such as preset values. The HDD/SSD 204 also stores information that the CPU 201 uses when executing a program.

The I/F 205 is an interface that allows the DFE 102 to communicate with, e.g., the client PC 101, the image forming apparatus 103, and the management server 104.

Figure 3:
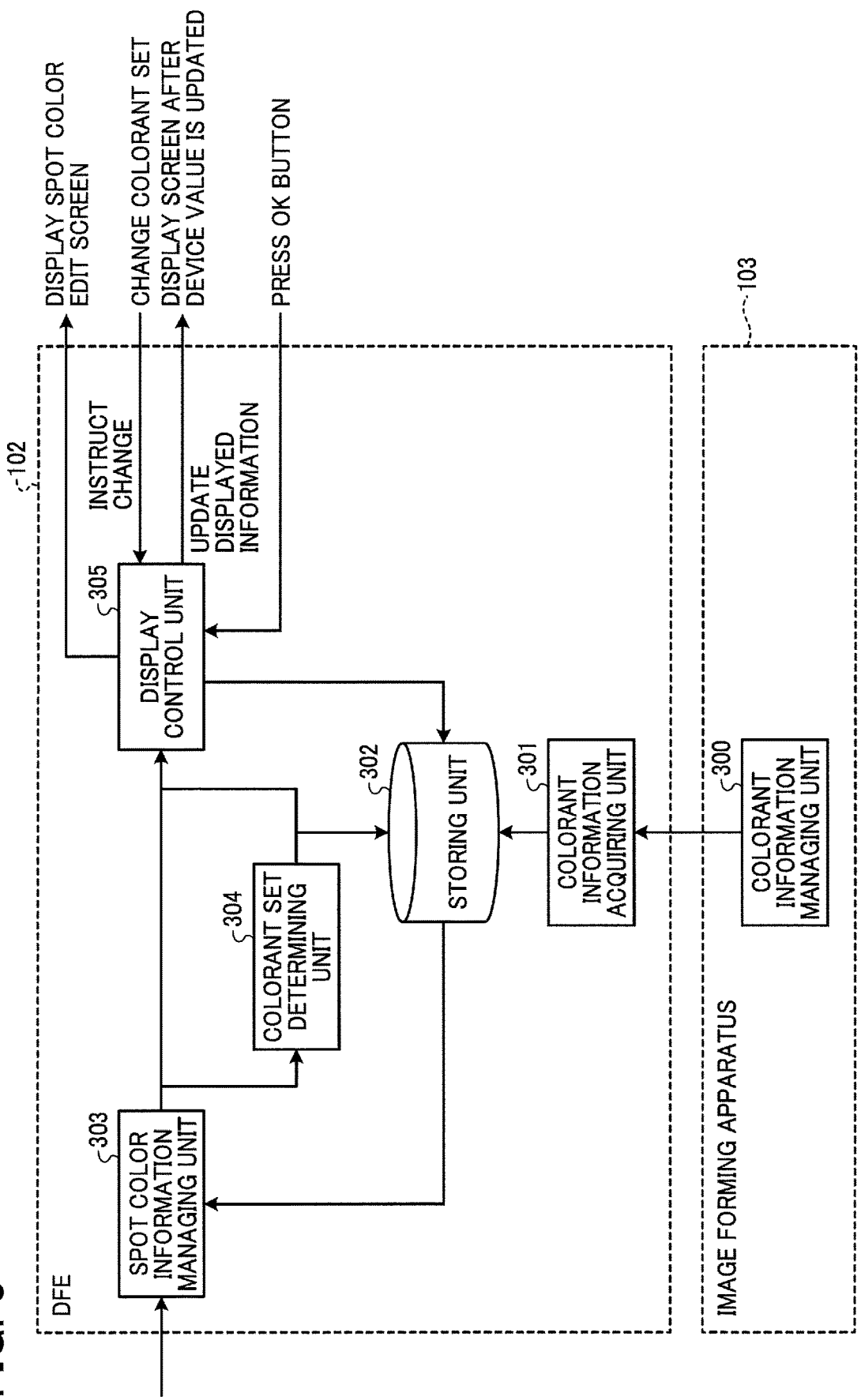
FIG. 3 is a block diagram illustrating an example of a functional configuration of the DFE and the image forming apparatus included in the information processing system according to the first embodiment.

Referring now to FIG. 3, a description is given of a functional configuration of the DFE 102 and the image forming apparatus 103 according to the present embodiment.

FIG. 3 is a block diagram illustrating an example of the functional configuration of the DFE 102 and the image forming apparatus 103 included in the information processing system according to the first embodiment.

In the present embodiment, as illustrated in FIG. 3, the image forming apparatus 103 includes a colorant information managing unit 300. The colorant information managing unit 300 transmits colorant mounting information to the DFE 102 when the power of the image forming apparatus 103 is turned on or when a colorant mounted on the image forming apparatus 103 is replaced. Here, the colorant mounting information is information indicating a colorant mounted on the image forming apparatus 103.

In the present embodiment, as illustrated in FIG. 3, the DFE 102 serving as an image processing apparatus includes a colorant information acquiring unit 301, a storing unit 302, a spot color information managing unit 303, a colorant set determining unit 304, and a display control unit 305. Various functional units of the DFE 102 (e.g., the colorant information acquiring unit 301, the storing unit 302, the spot color information managing unit 303, the colorant set determining unit 304, and the display control unit 305) may be implemented by an information processing apparatus or a system on the Web and provided to a user PC or the image forming apparatus 103 as a cloud service via a network such as the Internet.

The colorant information acquiring unit 301 acquires the colorant mounting information from the image forming apparatus 103 (specifically, the colorant information managing unit 300) and stores the acquired colorant mounting information in the storing unit 302.

In response to an instruction of displaying an edit screen that is used to edit a spot color, the spot color information managing unit 303 acquires, from the storing unit 302, dictionary information of the spot color to be edited and the colorant mounting information, for example. Here, the spot color is a color that is reproduced with at least one of a process color colorant and a colorant different from the process color colorant. The dictionary information includes, e.g., a determination completion flag and colorant set information. The determination completion flag is information indicating whether a colorant set has been classified. The colorant set is a combination of colorants with which a spot color (or an approximate color of the sport color) is reproduceable. The colorant set information is information indicating at least one colorant set that reproduces a spot color. The colorant set that reproduces a spot color may include a colorant set that reproduces an approximate color of the spot color.

The spot color information managing unit 303 transmits, e.g., the colorant mounting information and the dictionary information to the colorant set determining unit 304 or the display control unit 305, depending on whether the colorant set, which is a combination of colorants with which a spot color is reproduceable, has been classified and depending on whether the colorant mounting information is changed.

The colorant set determining unit 304 acquires, e.g., the colorant mounting information and the dictionary information from the spot color information managing unit 303. According to the colorant mounting information, the colorant set determining unit 304 classifies the colorant sets indicated by the colorant set information included in the dictionary information into two groups: a colorant set group A (as a first colorant set) and a colorant set group B (as a second colorant set).

Here, the colorant set group A includes colorant sets with which a spot color is reproduceable without a replacement of a colorant mounted on the image forming apparatus 103. By contrast, the colorant set group B includes colorant sets with which a spot color is reproduceable with a replacement of a colorant mounted on the image forming apparatus 103. Note that the colorant set with which a spot color is reproduceable without a replacement of a colorant mounted on the image forming apparatus 103, that is, a colorant set of the colorant set group A may be a colorant set with which a spot color is reproduceable with a replacement of a colorant currently mounted on the image forming apparatus 103 with the same colorant. For example, the colorant set with which a spot color is reproduceable without a replacement of a colorant mounted on the image forming apparatus 103 may be a colorant set with which a spot color is reproduceable with a replacement of a magenta (M) colorant currently mounted on the image forming apparatus 103 and running out with a new M colorant.

After classifying the colorant sets indicated by the colorant set information into the colorant set groups A and B, the colorant set determining unit 304 updates the determination completion flag included in the dictionary information and stores the updated dictionary information in the storing unit 302. The colorant set determining unit 304 also transmits the updated dictionary information to the display control unit 305.

The display control unit 305 displays various kinds of information such as an edit screen on the display such as an organic electroluminescence (OEL) display or a liquid crystal display. Specifically, the display control unit 305 displays the colorant set indicated by the colorant set information in a display mode in which the colorant set is identifiable as one of the colorant set group A and the colorant set group B on the display. The display control unit 305 also receives a selection (or a change) of a colorant set that is used to reproduce a spot color from the colorant set group A.

Thus, a colorant set that is used to reproduce a spot color is selectable for each spot color. Accordingly, an operation equivalent to determining a priority order of the colorant sets that are used to reproduce the spot color is executable. According to a combination of the colorants mounted on the image footling apparatus 103 or the type of print jobs, an intention of a user can be easily reflected on the colorant set that is used to reproduce the spot color. For example, when a plurality of spot colors is used in one image or when a plurality of spot colors is used in a plurality of print jobs, only a specific spot color is highly reproducible while the other spot colors are reproduced without using a special colorant taking into account the cost. Such an intention of a user can be easily reflected. In addition, a user easily identifies a colorant to be replaced when the user desires to reproduce a certain spot color, thus reducing the time and effort that the user needs to consider the replacement of the colorant.

Figure 4:
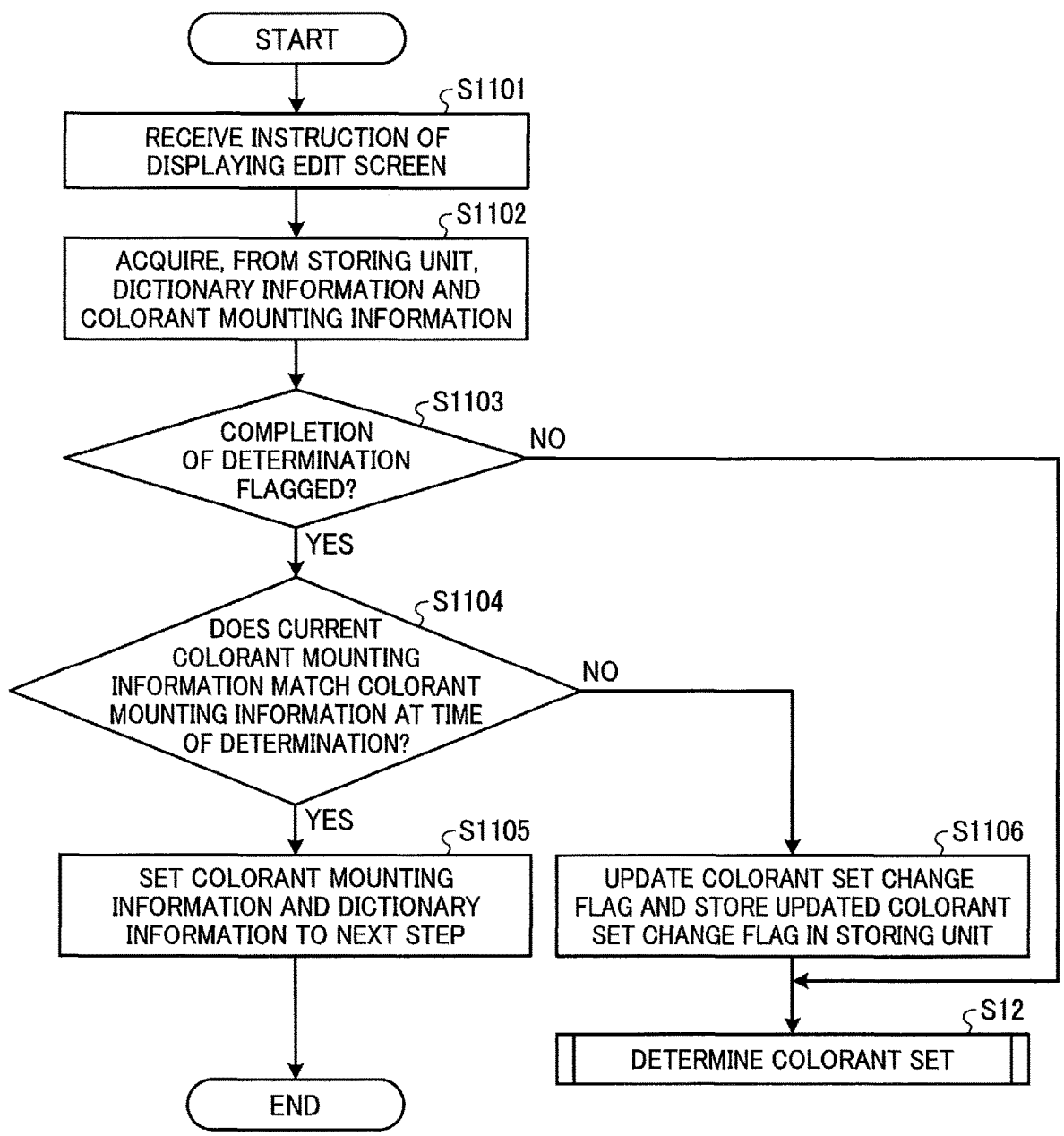
FIG. 4 is a flowchart illustrating an example of a process executed by a spot color information managing unit included in the DFE according to the first embodiment.

Referring now to FIG. 4, a description is given of a process executed by the spot color information managing unit 303.

FIG. 4 is a flowchart illustrating an example of the process executed by the spot color information managing unit 303 included in the DFE 102 according to the first embodiment.

In step S1101, the spot color information managing unit 303 receives an instruction of displaying an edit screen that is used to edit a spot color.

Subsequently, in step S1102, the spot color information managing unit 303 acquires, from the storing unit 302, the colorant mounting information and the dictionary information of the spot color to be edited.

As described above, the colorant mounting information is information indicating a colorant mounted on the image forming apparatus 103. In the present embodiment, as presented in Tables 1-1 and 1-2 below, the colorant mounting information includes colorant arrays for the number of colorants mountable on the image forming apparatus 103. Each of the colorant arrays includes a colorant type, a colorant identification (ID) identifying a colorant, and a mounting order. The mounting order indicates the numbers of the order in which the colorants are mounted (i.e., the order in which the colorants are superimposed when an image is formed) or "0" for the colorant array of a colorant that is not mounted on the image forming apparatus 103.

TABLE 1-1

| COLORANT TYPE | BLACK | CYAN | MAGENTA | YELLOW | NEON PINK |
|---|---|---|---|---|---|
| COLORANT ID | 1 | 2 | 3 | 4 | 5 |
| MOUNTING ORDER | 1 | 2 | 3 | 4 | 5 |

TABLE 1-2

| COLORANT TYPE | NEON YELLOW | RED | SILVER | GOLD | WHITE | CLEAR |
|---|---|---|---|---|---|---|
| COLORANT ID | 6 | 7 | 8 | 9 | 10 | 11 |
| MOUNTING ORDER | 0 | 0 | 0 | 0 | 0 | 0 |

The dictionary information is predetermined by, e.g., a color sample manufacturer, a printer manufacturer, or a user and stored in the storing unit 302. In the present embodiment, as presented in Tables 2-1 and 2-2 below, the dictionary information includes a dictionary name, a color name, an $L^*a^*b^*$ value, a selected colorant set, a determination completion flag, colorant mounting information at the time of determination, a colorant set change flag, a colorant set ID, colorant set information, and a determination result.

TABLE 2-1

| DICTIONARY NAME | COLOR NAME | L*A*B* VALUE | SELECTED COLORANT SET | DETERMINATION COMPLETION FLAG |
|---|---|---|---|---|
| R COLOR BOOK COATED | VIVID RED | (74.2, 65.0, 35.9) | 2 | 1 |
| . | . | . | . | . |
| . | . | . | . | . |
| . | . | . | . | . |

TABLE 2-2

| COLORANT MOUNTING INFORMATION AT THE TIME OF DETERMINATION | COLORANT SET CHANGE FLAG | COLORANT SET ID | COLORANT SET INFORMATION | DETERMINATION RESULT |
|---|---|---|---|---|
| ✕ SEE TABLES 1-1 AND 1-2 | 0 | 1 | ✕ SEE TABLES 3-1 AND 3-2 | B |
|  |  | 2 | ✕ SEE TABLES 3-1 AND 3-2 | A |
|  |  | 3 | ✕ SEE TABLES 3-1 AND 3-2 | A |
| . | . | . | . | . |
| . | . | . | . | . |
| . | . | . | . | . |

The dictionary name is a name of a spot-color dictionary. The color name is a name of a spot color. The L*a*b* value is a target L*a*b* value of a spot color.

The selected colorant set is information (i.e., colorant set ID described later) indicating a colorant set selected by a user among colorant sets with which a spot color is reproduceable. The selected colorant set is updated in response to a selection of a colorant set made by a user. In the present embodiment, colorant set ID "1" is set to a selected colorant set of the dictionary information that has never been edited by a user. Thereafter, when a user selects any colorant set, the selected colorant set is updated to a colorant set ID of the colorant set thus selected.

The colorant set ID is information identifying a colorant set with which a spot color is reproduceable. In the present embodiment, the colorant set ID indicates the number of colorant sets with which a spot color is reproduceable and a priority order of the colorant sets. Here, the priority order is a preset order. For example, the priority is relatively high on a colorant set simply including process color colorants that are highly likely to be mounted on the image forming apparatus 103 and that can reduce the use of special colorants. The priority is also relatively high on a colorant set recommended by a manufacturer.

The determination completion flag is information indicating whether, with respect to a spot color, the colorant sets indicated by the colorant set information included in the dictionary information have been classified into the colorant set groups A and B. In the present embodiment, "1" is set to the determination completion flag when, with respect to a spot color, the colorant sets indicated by the colorant set information included in the dictionary information have been classified into the colorant set groups A and B. By contrast, when, with respect to spot colors, the colorant sets indicated by the colorant set information included in the dictionary information have not been classified into the colorant set groups A and B, "0" is set to the determination completion flag. When the determination completion flag is "1," the spot color information managing unit 303 transmits, e.g., the colorant mounting information and the dictionary information to the display control unit 305. By contrast, when the determination completion flag is "0," the spot color information managing unit 303 transmits, e.g., the colorant mounting information and the dictionary information to the colorant set determining unit 304.

The colorant mounting information at the time of determination is colorant mounting information (as presented in Tables 1-1 and 1-2) at the time when the determination completion flag is last set.

The colorant set change flag is a flag indicating a past selected colorant set. In the present embodiment, "0" is set to the colorant set change flag when a spot color has not been edited by a user. By contrast, when the determination completion flag is "1" and the colorant mounting information does not match the colorant mounting information at the time of determination, e.g., "2" is set to the colorant set change flag indicating the past selected colorant set. Thereafter, when the setting of the selected colorant set is instructed to be fixed, "0" is set to the colorant set change flag.

The colorant set information is information indicating at least one colorant set that reproduces a spot color. In the present embodiment, as presented in Tables 3-1 and 3-2 below, the colorant set information includes a colorant set ID, a colorant set, and a device value for each colorant set with which a spot color is reproduceable. Each colorant set includes a colorant type, a colorant ID, and a mounting order of a colorant included in the colorant set. The colorant type is a type of a colorant that is used to reproduce a spot color. The mounting order (e.g., 1 to 5) is an order in which the colorants are mounted, that is, an order in which the colorants are superimposed to form a spot-color image. "0" is assigned to a colorant that is not used to reproduce a spot color.

TABLE 3-1

| COLORANT SET ID | COLORANT TYPE ID | BLACK 1 | CYAN 2 | MAGENTA 3 | YELLOW 4 | NEON PINK 5 |
|---|---|---|---|---|---|---|
| 1 | COLORANT SET | 1 | 2 | 3 | 4 | 0 |
|   | DEVICE VALUE | 0 | 0 | 10 | 0 | 0 |
| 2 | COLORANT SET | 1 | 2 | 3 | 4 | 5 |
|   | DEVICE VALUE | 0 | 0 | 45 | 0 | 60 |
| 3 | COLORANT SET | 1 | 2 | 3 | 4 | 0 |
|   | DEVICE VALUE | 0 | 0 | 75 | 53 | 0 |

TABLE 3-2

| COLORANT SET ID | COLORANT TYPE ID | NEON YELLOW 6 | RED 7 | SILVER 8 | GOLD 9 | WHITE 10 | CLEAR 11 |
|---|---|---|---|---|---|---|---|
| 1 | COLORANT SET | 0 | 5 | 0 | 0 | 0 | 0 |
|   | DEVICE VALUE | 0 | 70 | 0 | 0 | 0 | 0 |
| 2 | COLORANT SET | 0 | 0 | 0 | 0 | 0 | 0 |
|   | DEVICE VALUE | 0 | 0 | 0 | 0 | 0 | 0 |
| 3 | COLORANT SET | 0 | 0 | 0 | 0 | 0 | 0 |
|   | DEVICE VALUE | 0 | 0 | 0 | 0 | 0 | 0 |

The colorant set indicates the mounting order in Tables 3-1 and 3-2 because of the following reasons. First, it depends on the type and effect of colorants whether a special colorant is superimposed on other colorants or other colorants are superimposed on the special color. In addition, in a case in which the device value is converted with, e.g., a color profile and calculated, the mounting order of the colorants needs to match the mounting order of the colorants at the time when the color profile is generated.

The colorant set and the device value are predetermined by a printer manufacturer and set in the dictionary information. Alternatively, the DFE 102 may determine, in advance, respective coverages of hue, lightness, and saturation for each colorant. In this case, the DFE 102 picks up a colorant set to which a target L*a*b* value belongs. The DFE 102 then converts the target L*a*b* value with, e.g., a color profile generated with the colorant set thus picked up, to acquire a device value. The DFE 102 sets, in the dictionary information, the colorant set picked up and the device value thus acquired.

For a spot color defined by a device value or an L*a*b* value input by a user, the DFE 102 sets, in the dictionary information, a colorant set and a device value with reference to data of other spot colors defined by a color sample manufacturer by a value approximate to the device value or the L*a*b* value input by the user.

The determination result is information indicating a result of classification, made by the colorant set determining unit 304, of the colorant sets into the colorant set groups A and B.

Referring back to FIG. 4, after acquiring the colorant mounting information and the dictionary information, in step S1103, the spot color information managing unit 303 determines whether the completion of determination is flagged, that is, whether the determination completion flag included in the acquired dictionary information is "1."

When the completion of determination is not flagged, that is, when the determination completion flag is "0" (NO in step 1103), in step S12, the colorant set determining unit 304 executes a colorant set determination process of classifying the colorant sets indicated by the colorant set information included in the dictionary information into the colorant set groups A and B.

By contrast, when the completion of determination is flagged, that is, when the determination completion flag is "1" (YES in step S1103), in step S1104, the spot color information managing unit 303 determines whether the acquired colorant mounting information (i.e., the current colorant mounting information) matches the colorant mounting information at the time of determination.

When the current colorant mounting information does not match the colorant mounting information at the time of determination (NO in step S1104), in step S1106, the spot color information managing unit 303 updates the colorant set change flag included in the acquired dictionary information, that is, the spot color information managing unit 303 sets the selected colorant set to the colorant set change flag, and stores the updated colorant set change flag in the storing unit 302. Then, the spot color information managing unit 303 proceeds to step S12.

Figure 6:
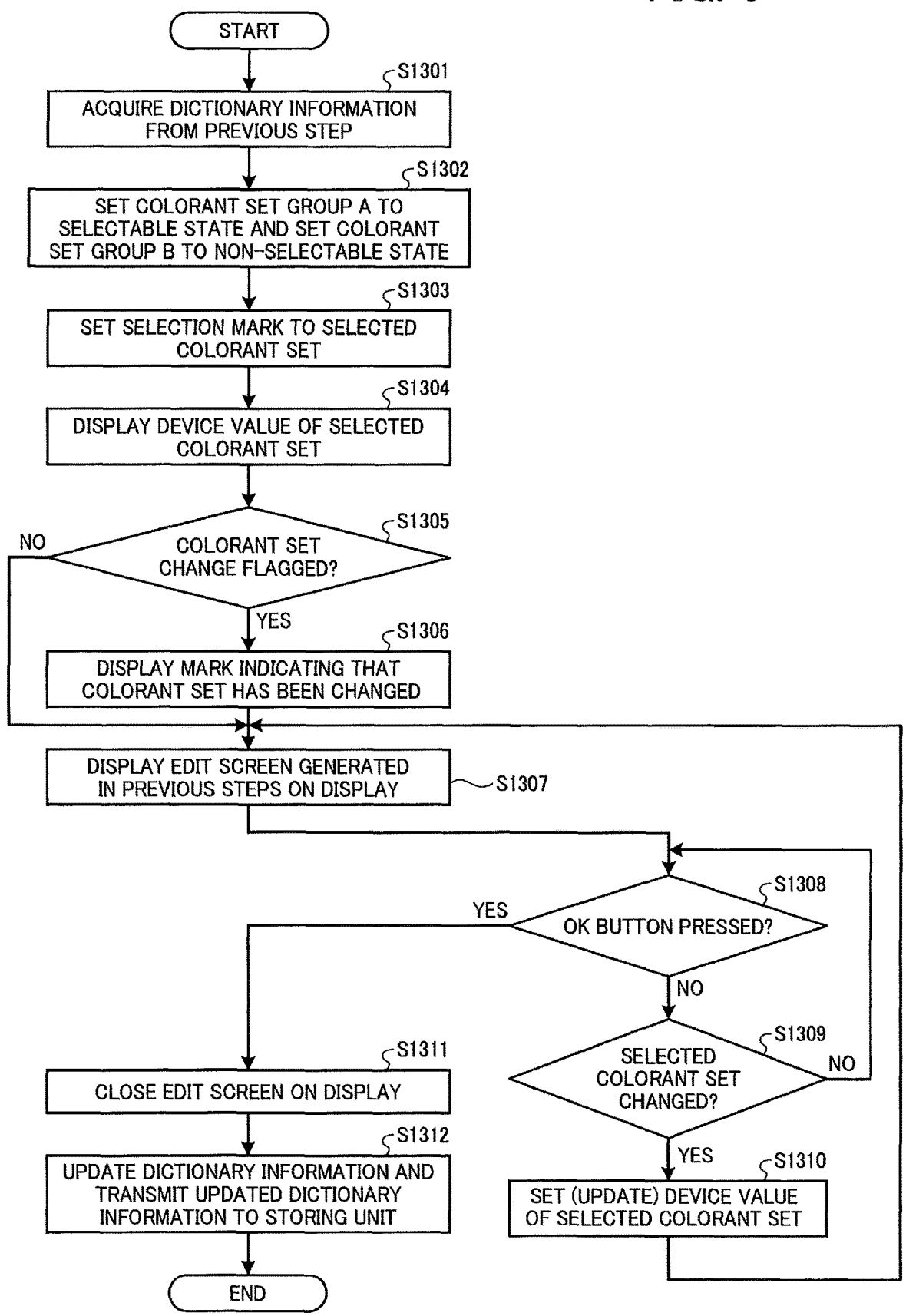
FIG. 6 is a flowchart illustrating an example of a process executed by a display control unit included in the DFE according to the first embodiment.

By contrast, when the current colorant mounting information matches the colorant mounting information at the time of determination (YES in step S1104), in step S1105, the spot color information managing unit 303 sets the colorant mounting information and the dictionary information to the next step (i.e., step S1301 illustrated in FIG. 6).

Figure 5:
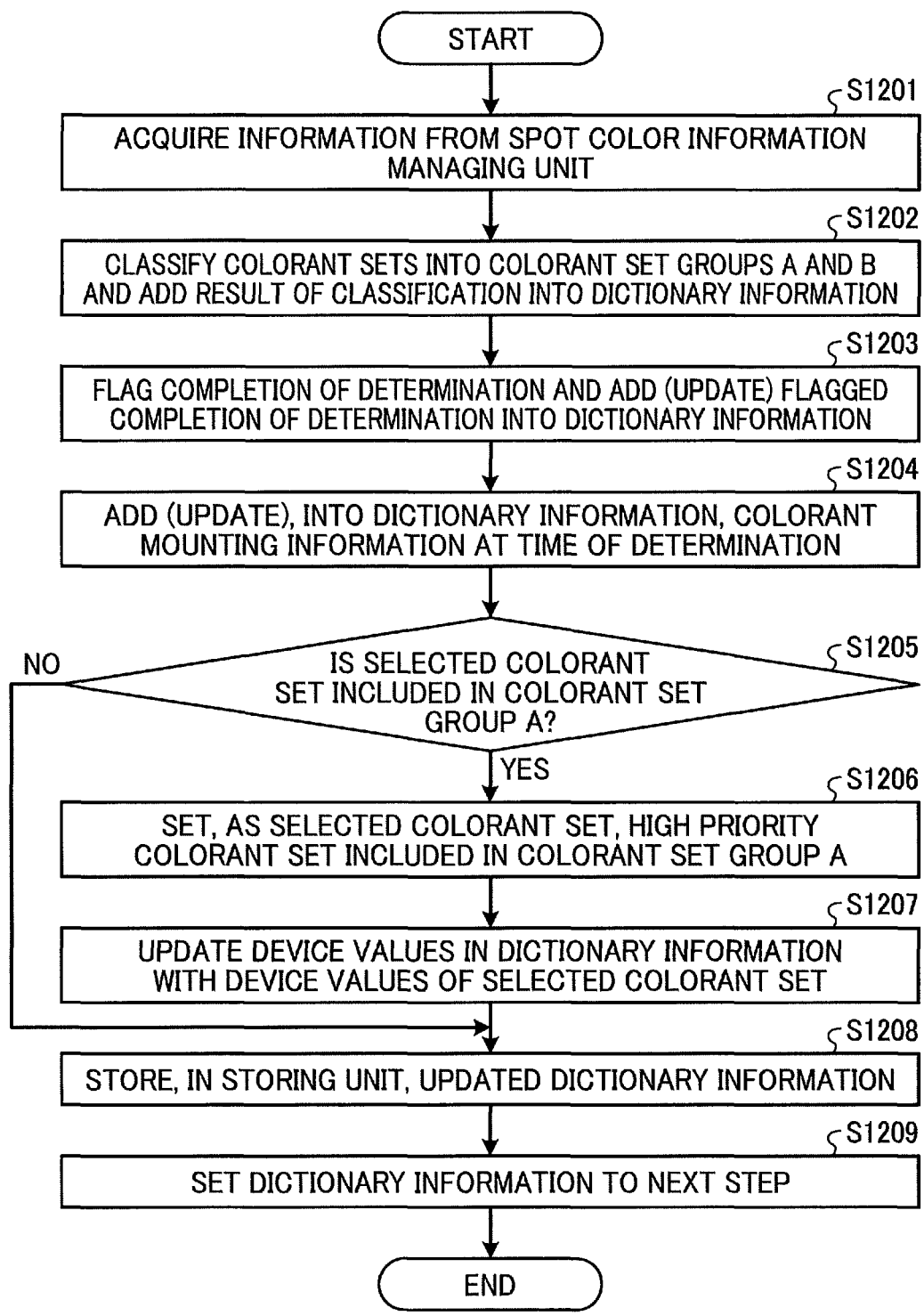
FIG. 5 is a flowchart illustrating an example of a colorant set determination process executed by a colorant set determining unit included in the DFE according to the first embodiment.

Referring now to FIG. 5, a description is given of a colorant set determination process executed by the colorant set determining unit 304.

FIG. 5 is a flowchart illustrating an example of the colorant set determination process executed by the colorant set determining unit 304 included in the DFE 102 according to the first embodiment.

First, in step S1201, the colorant set determining unit 304 acquires colorant mounting information and dictionary information from the spot color information managing unit 303.

Subsequently, in step S1202, the colorant set determining unit 304 classifies the colorant sets indicated by the colorant set information included in the dictionary information into the colorant set groups A and B, according to the colorant mounting information, and adds the result of classification to the dictionary information as a determination result.

In the present embodiment, as presented in Tables 4-1 and 4-2 below, the colorant set determining unit 304 classifies the colorant sets indicated by the colorant set information into the colorant set groups A and B, according to the difference between the mounting order included in the colorant mounting information (as presented in Tables 1-1 and 1-2) and the colorant set indicated by the colorant set information included in the dictionary information, that is, the mounting order indicated by the colorant set.

Specifically, among the colorant sets indicated by the colorant set information, the colorant set determining unit 304 classifies, into the colorant set group A, a colorant set having equal differences between preset colorant IDs (e.g., 1 to 4) and a difference of 0 or greater between colorant IDs other than the preset colorant IDs, as presented in Tables 4-1 and 4-2. On the other hand, among the colorant sets indicated by the colorant set information, the colorant set determining unit 304 classifies, into the colorant set group B, a colorant set having a difference less than 0 between the colorant IDs, as presented in Tables 4-1 and 4-2.

TABLE 4-1

| COLORANT ID | 1 | 2 | 3 | 4 | 5 |
|---|---|---|---|---|---|
| (0) MOUNTING ORDER (PRESENTED IN TABLES 1-1 AND 1-2) | 1 | 2 | 3 | 4 | 5 |
| (1) COLORANT SET (COLORANT SET ID 1 PRESENTED IN TABLES 3-1 AND 3-2) | 1 | 2 | 3 | 4 | 0 |
| (0)-(1) | 0 | 0 | 0 | 0 | 5 |
| (2) COLORANT SET (COLORANT SET ID 2 PRESENTED IN TABLES 3-1 AND 3-2) | 1 | 2 | 3 | 4 | 5 |
| (0)-(2) | 0 | 0 | 0 | 0 | 0 |
| (3) COLORANT SET (COLORANT SET ID 3 PRESENTED IN TABLES 3-1 AND 3-2) | 1 | 2 | 3 | 4 | 0 |
| (0)-(3) | 0 | 0 | 0 | 0 | 5 |

TABLE 4-2

| COLORANT ID | 6 | 7 | 8 | 9 | 10 | 11 |
|---|---|---|---|---|---|---|
| (0) MOUNTING ORDER (PRESENTED IN TABLES 1-1 AND 1-2) | 0 | 0 | 0 | 0 | 0 | 0 |
| (1) COLORANT SET (COLORANT SET ID 1 PRESENTED IN TABLES 3-1 AND 3-2) | 0 | 5 | 0 | 0 | 0 | 0 |
| (0)-(1) | 0 | −5 | 0 | 0 | 0 | 0 |
| (2) COLORANT SET (COLORANT SET ID 2 PRESENTED IN TABLES 3-1 AND 3-2) | 0 | 0 | 0 | 0 | 0 | 0 |
| (0)-(2) | 0 | 0 | 0 | 0 | 0 | 0 |
| (3) COLORANT SET (COLORANT SET ID 3 PRESENTED IN TABLES 3-1 AND 3-2) | 0 | 0 | 0 | 0 | 0 | 0 |
| (0)-(3) | 0 | 0 | 0 | 0 | 0 | 0 |

Referring back to FIG. 5, after classifying the colorant sets indicated by the colorant set information into the colorant set groups A and B, in step S1203, the colorant set determining unit 304 sets a determination completion flag included in the dictionary information. In other words, the colorant set determining unit 304 flags completion of determination and add (or update) the flagged completion of determination into the dictionary information.

In step S1204, the colorant set determining unit 304 updates the colorant mounting information at the time of determination included in the dictionary information, according to the colorant mounting information.

Subsequently, in step S1205, the colorant set determining unit 304 determines whether the selected colorant set included in the dictionary information is included in the colorant set group A.

When the selected colorant set included in the dictionary information is included in the colorant set group A (YES in step S1205), in step S1206, the colorant set determining unit 304 updates the selected colorant set with a colorant set ID of a colorant set having a smallest ID value (i.e., a highest priority colorant set) among the colorant sets included in the colorant set group A.

In step S1207, the colorant set determining unit 304 updates the device value of the colorant set information included in the dictionary information with the device value of the selected colorant set.

Thereafter, in step S1208, the colorant set determining unit 304 stores the updated dictionary information in the storing unit 302.

In step S1209, the colorant set determining unit 304 sets the updated dictionary information to the next step (i.e., step S1301 illustrated in FIG. 6).

By contrast, when the selected colorant set included in the dictionary information is not included in the colorant set group A (NO in step S1205), in step S1208, the colorant set determining unit 304 stores the dictionary information in the storing unit 302.

In step S1209, the colorant set determining unit 304 sets the dictionary information to the next step (i.e., step S1301 illustrated in FIG. 6).

Referring now to FIG. 6, a description is given of a process executed by the display control unit 305.

FIG. 6 is a flowchart illustrating an example of the process executed by the display control unit 305 included in the DFE 102 according to the first embodiment.

In step S1301, the display control unit 305 acquires, from the spot color information managing unit 303 or the colorant set determining unit 304, the dictionary information of a spot color to be edited (in other words, a spot color for which a colorant set is set to reproduce the spot color). The dictionary information of the spot color to be edited is the dictionary information set in the previous step (i.e., step S1105 illustrated in FIG. 4 or step S1209 illustrated in FIG. 5). Subsequently, the display control unit 305 generates, according to the dictionary information, an edit screen that is used to edit the spot color.

FIGS. 7 and 8 are diagrams illustrating examples of an edit screen generated in the DFE 102 according to the first embodiment.

In the present embodiment, the display control unit 305 generates an edit screen 700 according to the dictionary information. The edit screen 700 includes spot color information 701, a mounted colorant set 702, colorant set selection information 703, device value change information 704, and an okay (OK) button 705.

The spot color information 701 includes, e.g., a dictionary name (e.g., "spot color dictionary: R Color Book Coated"), a color name (e.g., "spot color name: Vivid Red"), and an L*a*b* value (e.g., "Lab value: (74.2, 65.0, 35.9)") included in the dictionary information.

The mounted colorant set 702 is information indicating a colorant set indicated by the colorant mounting information at the time of determination included in the dictionary information. The colorant set selection information 703 includes the colorant set indicated by the colorant set information and a radio button that is used to set the colorant set as a selected colorant set that is used to reproduce a spot color. The device value change information 704 includes an input window that is used to change the device value of the selected colorant set. The OK button. 705 is a button that is used to instruct completion of selection of a colorant set as the selected colorant set.

Referring back to FIG. 6, in step S1302, the display control unit 305 sets the colorant set group A to a selectable state and the colorant set group B to a non-selectable state on the edit screen, among the colorant sets indicated by the colorant set information included in the dictionary information. That is, the display control unit 305 displays, on the edit screen, the colorant sets of the colorant set group A as being selectable and the colorant sets of the colorant set group B as being non-selectable. In the present embodiment, for example, the display control unit 305 grays out a radio button for the colorant set included in the colorant set group B, among the radio buttons included in the colorant set selection information 703 illustrated in FIG. 7, thus setting the colorant set included in the colorant set group B to the non-selectable state.

In step S1303, the display control unit 305 displays a selection mark on a radio button for the selected colorant set, among the colorant sets indicated by the colorant set information included in the dictionary information, thus setting the selected colorant set to a selected state.

In step S1304, the display control unit 305 displays the device value in the input window included in the device value change information 704.

Subsequently, in step S1305, the display control unit 305 determines whether the colorant set change is flagged. Specifically, in step S1305, the display control unit 305 determines whether the colorant set change flag included in the dictionary information is set, that is, whether the colorant set change flag is "1" or greater.

When the colorant set change is flagged (YES in step S1305), in step S1306, the display control unit 305 displays information (e.g., the star mark illustrated in FIG. 8) specifying the colorant set of the colorant set ID indicated by the colorant set change flag among the colorant sets indicated by the colorant set information included in the dictionary information.

Then, in step S1307, the display control unit 305 displays the edit screen generated in steps S1302 to S1306 on the display.

By contrast, when the colorant set change is not flagged (NO in step S1305), in step S1307, the display control unit 305 displays the edit screen generated in steps S1302 to S1304 on the display.

In step S1308, the display control unit 305 determines whether the OK button 705 is pressed to instruct the determination of the selected colorant set.

When the display control unit 305 determines that the OK button 705 is not pressed (NO in step S1308), in step S1309, the display control unit 305 determines whether the selected colorant set is changed.

When the display control unit 305 determines that the selected colorant set is changed (YES in step S1309), in step S1310, the display control unit 305 changes (or updates) the device value of the colorant set information included in the dictionary information.

Then, the display control unit 305 returns to step S1307.

By contrast, when the display control unit 305 determines that the selected colorant set is not changed (NO in step S1309), the display control unit 305 returns to step S1308 to determine again whether the OK button 705 is pressed.

When the display control unit 305 determines whether the OK button 705 is pressed (YES in step S1308), in step S1311, the display control unit 305 finishes displaying the edit screen on the display.

In step S1312, the display control unit 305 updates the dictionary information and stores the updated dictionary information in the storing unit 302.

Referring now to FIG. 9, a description is given of an entire process of selecting a colorant set as a selected colorant set in the DFE 102 according to the present embodiment.

Figure 9A:
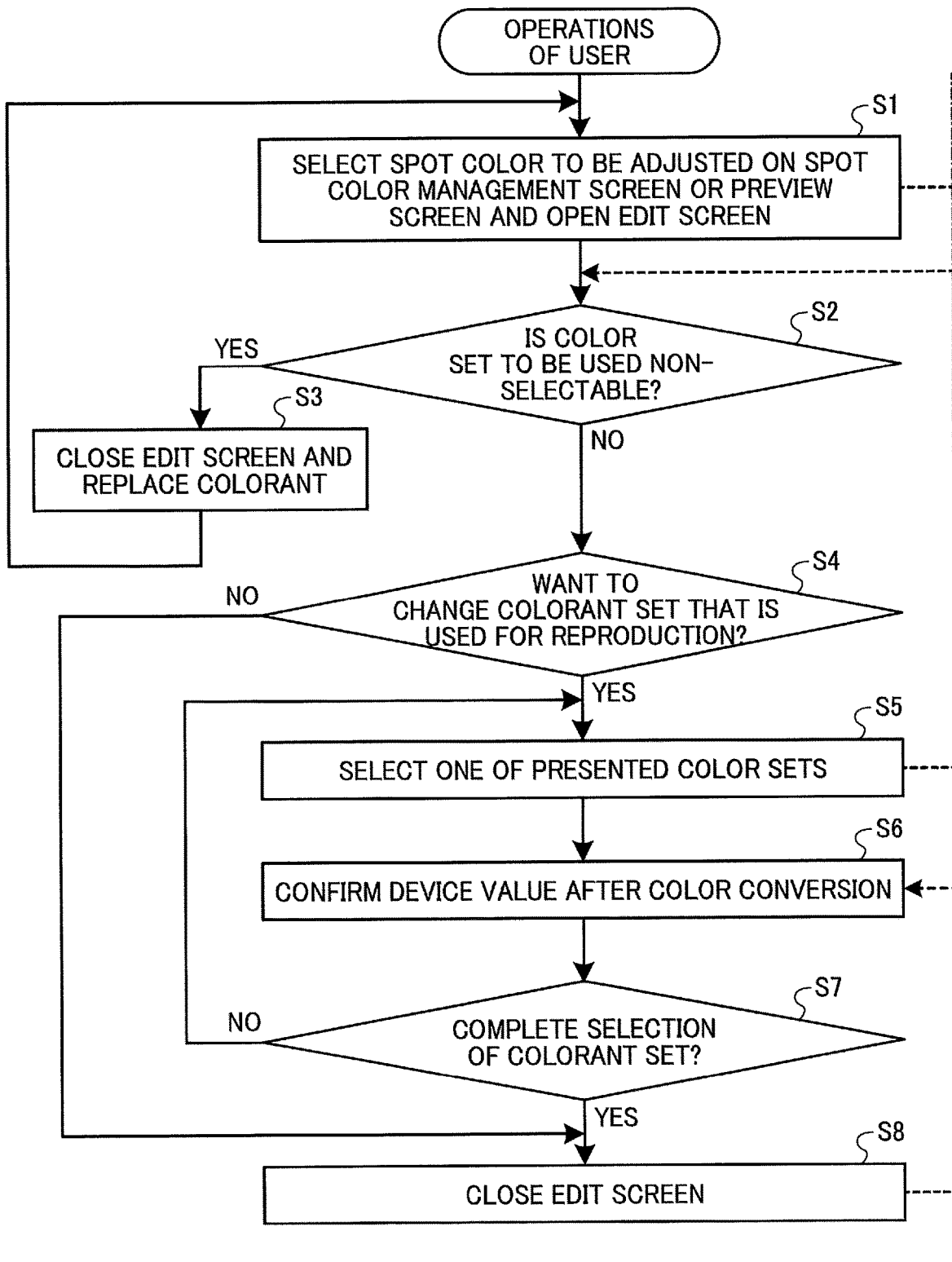
FIG. 9 including FIG. 9A
FIG. 9B is a sequence diagram illustrating an example of an entire process of selecting a colorant set as a selected colorant set in the DFE according to the first embodiment.
Figure 9B:
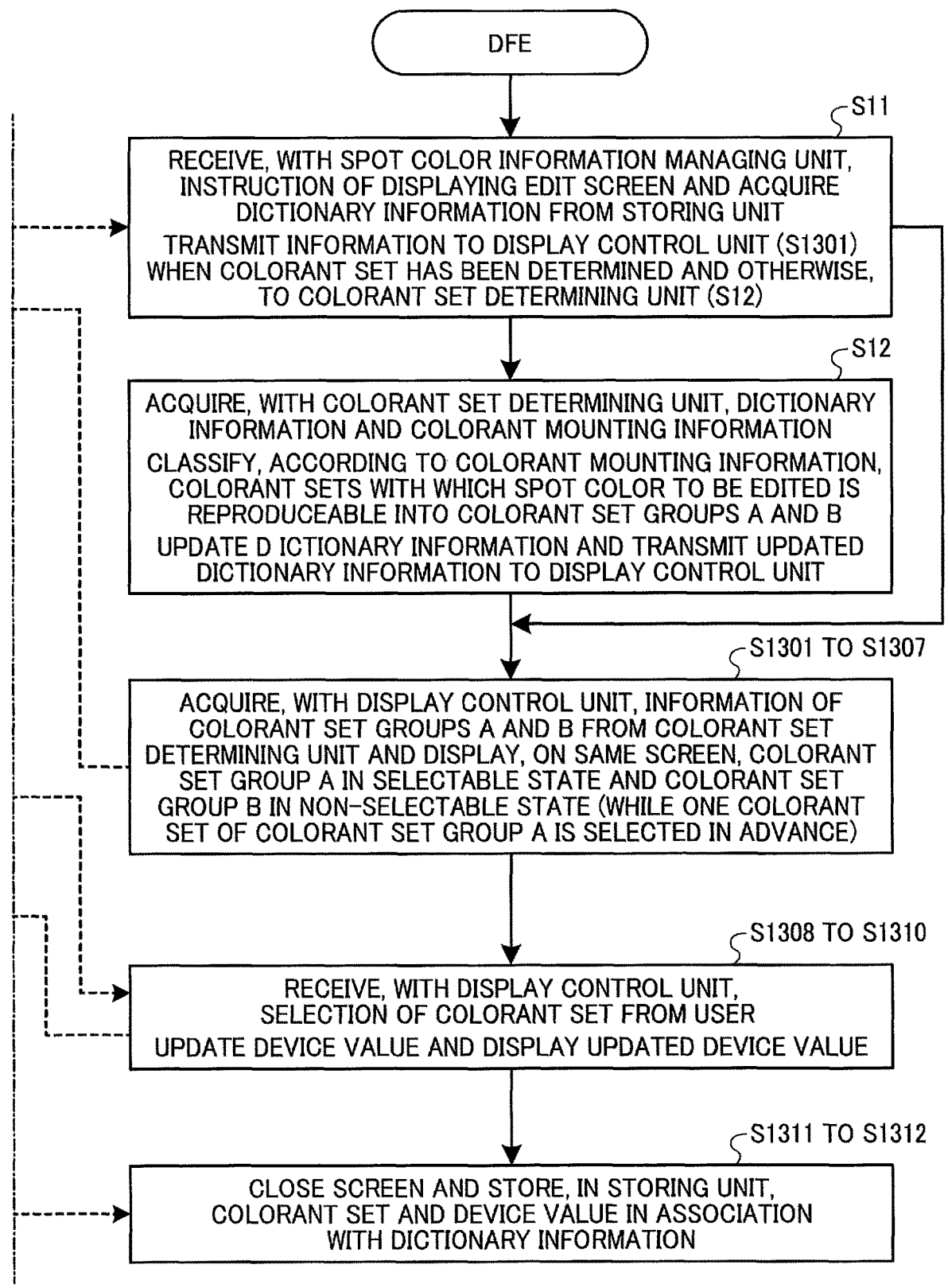

FIG. 9 including FIG. 9A and FIG. 9B is a sequence diagram illustrating an example of the entire process of selecting a colorant set as a selected colorant set in the DFE 102 according to the first embodiment.

When a user (e.g., a printing company that specializes in commercial printing) performs printing in response to a printing order, the user may print, with a spot color, a specific object (e.g., a company logo), a specific place, or a specific color in print data. At this time, the user may use colorants currently mounted on the image forming apparatus 103 or replace the colorants currently mounted on the image forming apparatus 103 with colorants that are not currently mounted on the image forming apparatus 103. Thus, the user may perform printing with the spot color. There is a plurality of possible ways of reproducing the spot color, depending on the combination of colorants or the setting of the device value. In consideration of, e.g., the reproducibility of the color, the cost, whether the user has a necessary colorant, and the residual amount of the colorant, the user determines how to reproduce the spot color, and edits and sets a combination of colorants and device values. For example, the user makes settings with an edit screen on the operation screen of the DFE 102 before starting printing with a spot color or in order to confirm whether the printing is possible in advance.

Specifically, first, the display control unit 305 of the DFE 102 refers to the dictionary information stored in the storing unit 302 to read, e.g., the color name and the L*a*b* value. The display control unit 305 then displays, on the display of the DFE 102, a spot color management screen or a preview screen including, e.g., the read color name and a device value of a colorant set (CMYK) converted from the read L*a*b* value. In step S1, the user selects a spot color to be edited on the spot color management screen or the preview screen displayed on the display of the DFE 102 and inputs an instruction of displaying an edit screen to edit the spot color.

In step S11, the spot color information managing unit 303 executes the process illustrated in FIG. 4. That is, the spot color information managing unit 303 receives the input of the instruction of displaying the edit screen and acquires the dictionary information from the storing unit 302. When the colorant set determination process has been performed, the spot color information managing unit 303 transmits the dictionary information to the display control unit 305. By contrast, when the colorant set determination process has not been performed, the spot color information managing unit 303 transmits the dictionary information to the colorant set determining unit 304.

In response to the dictionary information transmitted from the spot color information managing unit 303, in step S12, the colorant set determining unit 304 executes the colorant set determination process illustrated in FIG. 5. That is, according to the dictionary information and the colorant mounting information, the colorant set determining unit 304 classifies the colorant sets with which the spot color is reproduceable into the colorant set groups A and B. The colorant set determining unit 304 updates the dictionary information according to the classification and transmits the updated dictionary information to the display control unit 305.

Subsequently, the display control unit 305 executes the operations in step S1301 to S1307 illustrated in FIG. 6. That is, the display control unit 305 acquires, from the dictionary information, the information of the colorant set groups A and B with which the spot color is reproduceable. The display control unit 305 then displays, on the display, the edit screen that displays the colorant set group A in a selectable state and the colorant set group B in a non-selectable state.

In response to the edit screen being displayed on the display of the DFE 102, in step S2, the user determines whether a colorant set that the user desires to use to reproduce the spot color is non-selectable.

When the colorant set that the user desires to use to reproduce the spot color is non-selectable (YES in step S2), in step S3, the user closes the edit screen and replaces a colorant mounted on the image forming apparatus 103.

By contrast, the colorant set that the user desires to use to reproduce the spot color is selectable (NO in step S2), in step S4, the user determines whether to change the colorant set that is used to reproduce the spot color.

When the user determines not to change the colorant set that is used to reproduce the spot color (NO in step S4), in step S8, the user closes the edit screen and completes the selection of the colorant set as a selected colorant set.

By contrast, when the user determines to change the colorant set that is used to reproduce the spot color (YES in step S4), in step S5, the user selects a single colorant set from the colorant set group A displayed on the edit screen.

In response to the single colorant set being selected from the colorant set group A on the edit screen, the display control unit 305 executes the operations in steps S1308 to S1310 illustrated in FIG. 6. That is, the display control unit 305 receives the selection of the single colorant set as a selected colorant set. The display control unit 305 updates the device value displayed on the edit screen and displays the updated device value.

In step S6, the user confirms the device value displayed on the edit screen. In step S7, the user determines whether to complete the selection of the colorant set.

When the user determines not to complete the selection of the colorant set (NO in step S7), the user returns to step S5 to reselect a colorant set.

By contrast, the user determines to complete the selection of the colorant set (YES in step S7), in step S8, the user closes the edit screen and completes the selection of the colorant set as a selected colorant set.

In response to the edit screen being closed, the display control unit 305 executes the operations in steps S1311 to S1312 illustrated in FIG. 6. That is, the display control unit 305 updates the selected colorant set and the device value included in the dictionary information.

As described above, the DFE 102 of the first embodiment allows, e.g., a user to select, for each spot color, a colorant set that is used to reproduce the spot color. Accordingly, the DFE 102 of the first embodiment allows the user to execute an operation equivalent to determining a priority order of the colorant sets that are used to reproduce the spot color. The DFE 102 of the first embodiment also facilitates reflection of an intention of the user on the colorant set that is used to reproduce the spot color, according to a combination of the colorants mounted on the image forming apparatus 103 or the type of print jobs. Further, the DFE 102 of the first embodiment allows the user to easily confirm the colorant to be replaced when the user desires to reproduce a certain spot color, thus reducing the time and effort that the user needs to consider the replacement of the colorant.

Now, a description is given of a variation.

In the present variation, in response to a replacement of a colorant mounted on the image forming apparatus 103, the display is updated on which the colorant set is identifiable as one of the colorant set group A and the colorant set group B. A description is now given of features different from the features of the embodiment described above.

Referring now to FIG. 10, a description is given of an entire process of selecting a colorant set as a selected colorant set in the DFE 102 according to the present variation.

Figure 10B:
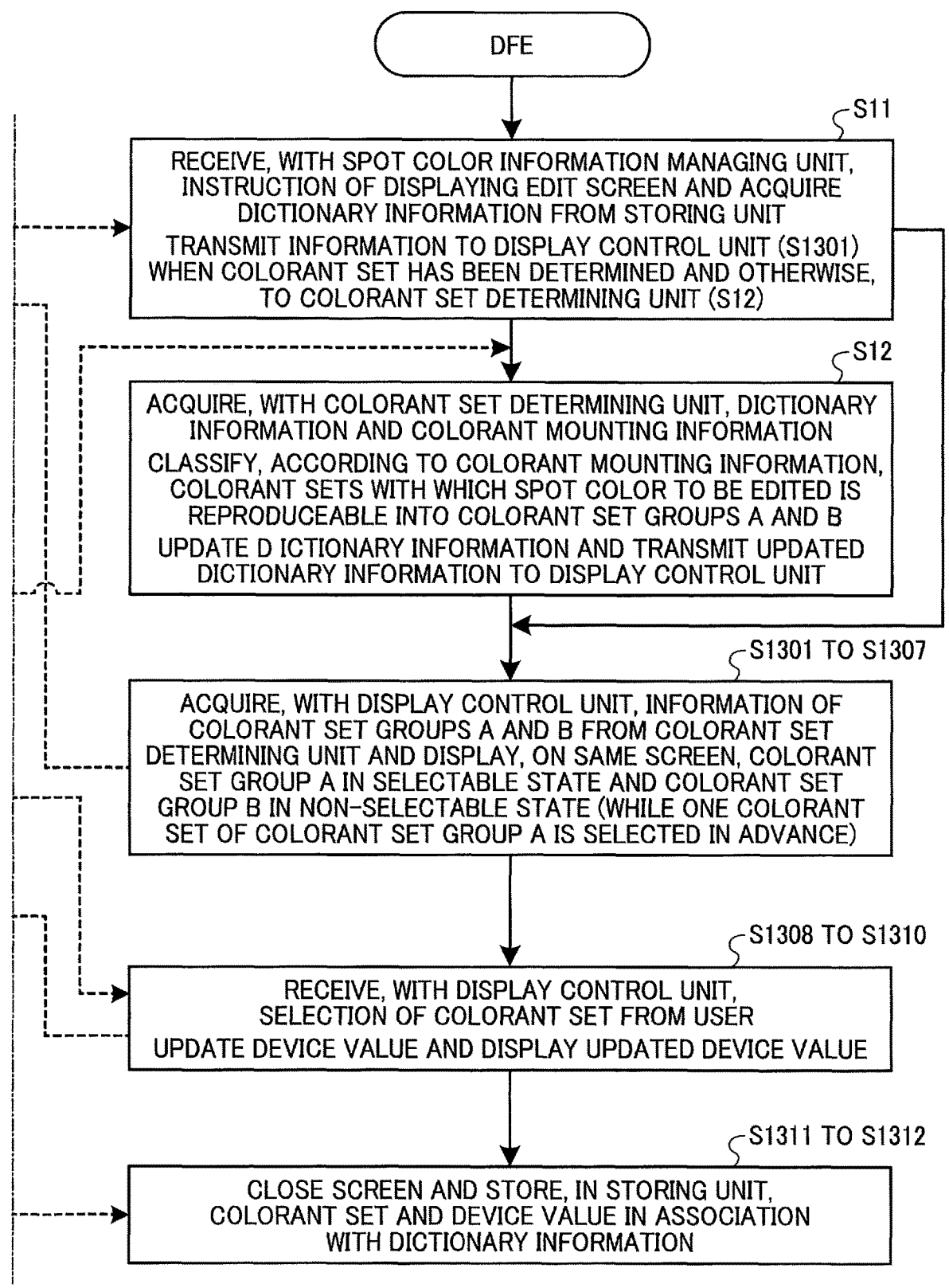
FIG. 10B is a sequence diagram illustrating an example of an entire process of selecting a colorant set as a selected colorant set in the DFE according to a variation.

FIG. 10 including FIG. 10A and FIG. 10B is a sequence diagram illustrating an example of the entire process of selecting a colorant set as a selected colorant set in the DFE 102 according to the present variation.

In the present variation, when a colorant set that a user desires to use to reproduce a spot color is non-selectable (YES in step S2), in step S9, the user replaces a colorant mounted on the image forming apparatus 103 without closing the edit screen. In response to the replacement of the colorant, in step S12, the colorant set determining unit 304 of the DFE 102 executes again the colorant set determination process illustrated in FIG. 5. That is, according to the dictionary information and the colorant mounting information after the replacement of the colorant made by the user, the colorant set determining unit 304 classifies the colorant sets with which the spot color is reproduceable into the colorant set groups A and B. The colorant set determining unit 304 updates the dictionary information according to the classification and transmits the updated dictionary information to the display control unit 305.

Subsequently, the display control unit 305 executes again the operations in step S1301 to S1307 illustrated in FIG. 6. That is, the display control unit 305 acquires, from the dictionary information, the information of the colorant set groups A and B with which the spot color is reproduceable. According to the acquired information of the colorant set groups A and B, the display control unit 305 updates the edit screen displayed on the display. In other words, in response to a replacement of a colorant mounted on the image forming apparatus 103, the display control unit 305 updates the display on the edit screen on which the colorant set that reproduces a spot color is identifiable as one of the colorant set group A and the colorant set group B.

Now, a description is given of a printing process in the image forming apparatus 103 with a colorant set selected on the edit screen. First, a user executes a job according to information of a spot color edited and set on the edit screen of the DFE 102. The information includes settings for reproducing a specific spot color by a combination of colorants and device values. When the user uses, e.g., drawing software of a PC to draw a desired object (e.g., a company logo) with a spot color (e.g., vivid red) and executes printing, the PC transmits, to the DFE 102, a print instruction of printing the target object with vivid red. The DFE 102 retrieves, for the vivid red, a selected colorant set and a device value edited and set in advance by the user. The DFE 102 then transmits the print instruction to the image forming apparatus 103.

Now, a description is given of a second embodiment.

In the present embodiment, the display displays information identifying a colorant set including a colorant that is used to reproduce the spot color having a residual amount less than a given amount. A redundant description of like configurations of the first and second embodiments is herein omitted.

Figure 11:
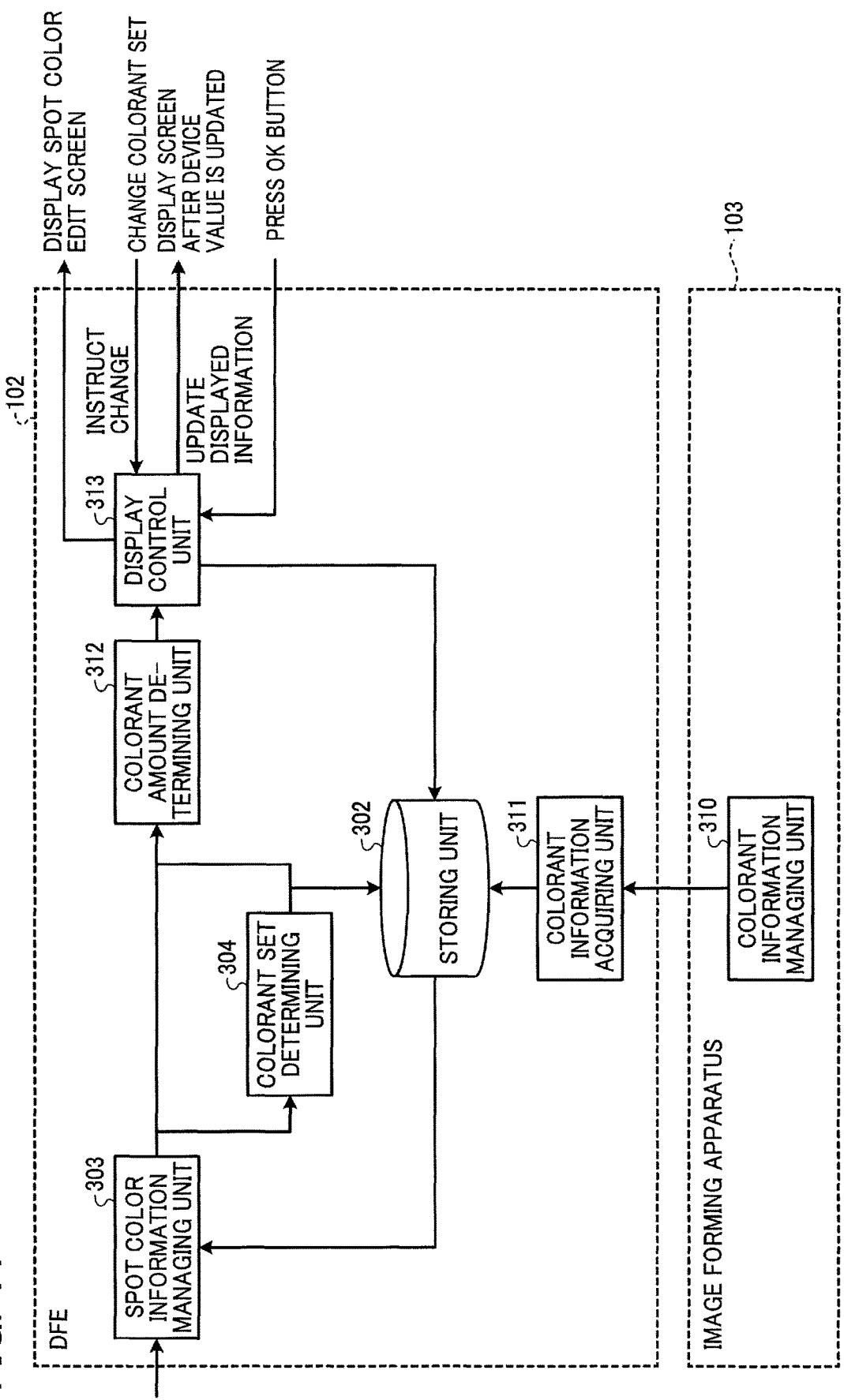
FIG. 11 is a block diagram illustrating an example of a functional configuration of a DFE and an image forming apparatus included in an information processing system according to a second embodiment.

Referring now to FIG. 11, a description is given of a functional configuration of the DFE 102 and then image forming apparatus 103 according to the present embodiment.

FIG. 11 is a block diagram illustrating an example of the functional configuration of the DFE 102 and the image forming apparatus 103 included in an information processing system according to the second embodiment.

In the present embodiment, as illustrated in FIG. 11, the image forming apparatus 103 includes a colorant information managing unit 310. The colorant information managing unit 310 acquires colorant mounting information and colorant amount information. Here, the colorant amount information is information indicating a residual amount of one of a colorant mounted on the image forming apparatus 103 and a colorant having been mounted on the image forming apparatus 103 at least once. In the present embodiment, the colorant amount information of a colorant that is not currently mounted on the image forming apparatus 103 indicates a residual amount of the colorant in the most recent use. The colorant information managing unit 310 transmits, to the DFE 102, the colorant mounting information and the colorant amount information acquired. In the present embodiment, the colorant information managing unit 310 transmits the colorant amount information to the DFE 102 when the power of the image forming apparatus 103 is turned on or off, when a colorant mounted on the image forming apparatus 103 is replaced, or when the image forming apparatus 103 completes printing.

For example, as presented in Tables 5-1 and 5-2 below, the colorant amount information includes a colorant ID of a colorant mountable on the image forming apparatus 103 in association with a colorant amount representing the residual amount of the colorant as a percentage between 0% and 100%.

TABLE 5-1

| COLORANT TYPE | BLACK | CYAN | MAGENTA | YELLOW | NEON PINK |
|---|---|---|---|---|---|
| COLORANT ID | 1 | 2 | 3 | 4 | 5 |
| COLORANT AMOUNT | 98 | 25 | 45 | 10 | 14 |

TABLE 5-2

| COLORANT TYPE | NEON YELLOW | RED | SILVER | GOLD | WHITE | CLEAR |
|---|---|---|---|---|---|---|
| COLORANT ID | 6 | 7 | 8 | 9 | 10 | 11 |
| COLORANT AMOUNT | 82 | 20 | 0 | 0 | 0 | 0 |

In the present embodiment, as illustrated in FIG. 11, the DFE 102 includes a colorant information acquiring unit 311, the storing unit 302, the spot color information managing unit 303, the colorant set determining unit 304, a colorant amount determining unit 312, and a display control unit 313.

The colorant information acquiring unit 311 acquires the colorant mounting information and the colorant amount information from the image forming apparatus 103 (specifically, the colorant information managing unit 310) and stores, in the storing unit 302, the colorant mounting information and the colorant amount information thus acquired.

According to the colorant mounting information and the colorant amount information, the colorant amount determining unit 312 determines whether a colorant that is used to reproduce the spot color having a residual amount equal to or greater than a preset value (as a given amount). In the present embodiment, the colorant amount determining unit 312 acquires the dictionary information, the colorant mounting information, and the colorant amount information from the spot color information managing unit 303 or the colorant set determining unit 304. The colorant amount determining unit 312 determines whether a residual amount of a colorant indicated by the colorant amount information is equal to or greater than the preset value. Here, the preset value is a residual amount of a colorant assumed to be necessary from the color adjustment of a spot color to the completion of printing (i.e., image formation). As presented in Tables 6-1 and 6-2 below, among the types of colorants included in the colorant sets indicated by the colorant set information included in the dictionary information, the colorant amount determining unit 312 sets "1" to a colorant amount determination flag for a colorant having a residual amount less than the preset value; whereas the colorant amount determining unit 312 sets "0" to the colorant amount determination flag for a colorant having a residual amount equal to or greater than the preset value. Thereafter, the colorant amount determining unit 312 transmits the dictionary information, the colorant amount information, and the colorant mounting information to the display control unit 313.

Figure 12:
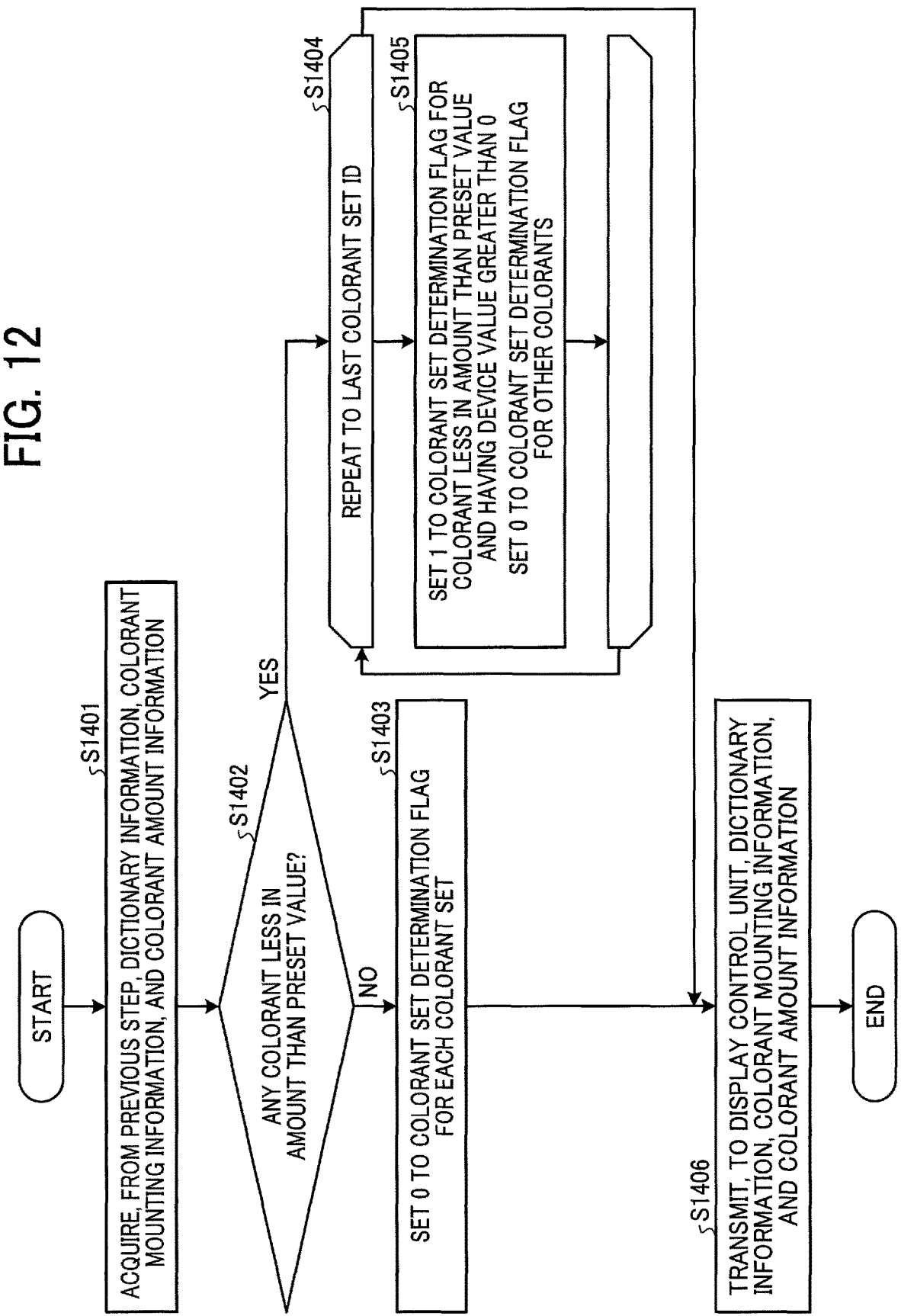
FIG. 12 is a flowchart illustrating an example of a process executed by a colorant amount determining unit included in the DFE according to the second embodiment.

Referring now to FIG. 12, a description is given of a process executed by the colorant amount determining unit 312.

TABLE 6-1

| COLORANT SET ID | COLORANT TYPE ID | BLACK 1 | CYAN 2 | MAGENTA 3 | YELLOW 4 | NEON PINK 5 |
|---|---|---|---|---|---|---|
| 1 | COLORANT SET | 1 | 2 | 3 | 4 | 0 |
|   | DEVICE VALUE | 0 | 0 | 10 | 0 | 0 |
|   | COLORANT AMOUNT DETERMINATION FLAG | 0 | 0 | 0 | 0 | 0 |
| 2 | COLORANT SET | 1 | 2 | 3 | 4 | 5 |
|   | DEVICE VALUE | 0 | 0 | 45 | 0 | 60 |
|   | COLORANT AMOUNT DETERMINATION FLAG | 0 | 0 | 0 | 0 | 1 |
| 3 | COLORANT SET | 1 | 2 | 3 | 4 | 0 |
|   | DEVICE VALUE | 0 | 0 | 75 | 53 | 0 |
|   | COLORANT AMOUNT DETERMINATION FLAG | 0 | 0 | 0 | 1 | 0 |

TABLE 6-2

| COLORANT SET ID | COLORANT TYPE ID | NEON YELLOW 6 | RED 7 | SILVER 8 | GOLD 9 | WHITE 10 | CLEAR 11 |
|---|---|---|---|---|---|---|---|
| 1 | COLORANT SET | 0 | 5 | 0 | 0 | 0 | 0 |
|   | DEVICE VALUE | 0 | 70 | 0 | 0 | 0 | 0 |
|   | COLORANT AMOUNT DETERMINATION FLAG | 0 | 0 | 0 | 0 | 0 | 0 |
| 2 | COLORANT SET | 0 | 0 | 0 | 0 | 0 | 0 |
|   | DEVICE VALUE | 0 | 0 | 0 | 0 | 0 | 0 |
|   | COLORANT AMOUNT DETERMINATION FLAG | 0 | 0 | 0 | 0 | 0 | 0 |
| 3 | COLORANT SET | 0 | 0 | 0 | 0 | 0 | 0 |
|   | DEVICE VALUE | 0 | 0 | 0 | 0 | 0 | 0 |
|   | COLORANT AMOUNT DETERMINATION FLAG | 0 | 0 | 0 | 0 | 0 | 0 |

The display control unit 313 displays, on the display, information identifying a colorant set including a colorant that is used to reproduce a spot color having a residual amount less than the preset value. In the present embodiment, according to the dictionary information, the colorant amount information, and the colorant mounting information, the display control unit 313 displays, on the display, residual amount information of a colorant having a residual amount less than the preset value, among the colorants included in a colorant set with which a spot color is reproduceable.

FIG. 12 is a flowchart illustrating an example of the process executed by the colorant amount determining unit 312 included in the DFE 102 according to the second embodiment.

In step S1401, the colorant amount determining unit 312 acquires the dictionary information, the colorant mounting information, and the colorant amount information from the previous step (i.e., the spot color information managing unit 303 or the colorant set determining unit 304). Subsequently, in step S1402, the colorant amount determining unit 312 determines whether any colorant has a residual amount less than the preset value according to the colorant amount information. Here, the preset value may be a common value preset in the DFE 102 for all kinds of colorants or a value preset in the DFE 102 for each colorant. Alternatively, the preset value may be a value received from a user via, e.g., the display. Alternatively, the preset value may be an amount of a colorant required for printing of a certain number of sheets with an amount of adhesion (i.e., an ink amount) of each colorant set based on an area percentage of an image in an input image and the number of sheets to be printed.

The colorant amount determining unit 312 compares the residual amount of each colorant indicated by the colorant amount information presented in Tables 5-1 and 5-2 with the preset value. When each colorant has a residual amount equal to or greater than the preset value (NO in step S1402), the colorant amount determining unit 312 proceeds to step S1403. By contrast, when at least one colorant has a residual amount less than the preset value (YES in step S1402), the colorant amount determining unit 312 proceeds to step S1404 to repeat the operation in step S1405 to the last colorant set ID.

When each colorant has a residual amount equal to or greater than the preset value (NO in step S1402), in step S1403, the colorant amount determining unit 312 sets 0 to the colorant amount determination flag of colorants for each colorant set indicated by the colorant set information included in the dictionary information. When each colorant has a residual amount equal to or greater than the preset value, the display control unit 313 does not need to display, on the display, the residual amount information to cause, e.g., a user to pay attention to the residual amount of the colorants.

By contrast, when at least one colorant has a residual amount less than the preset value (YES in step S1402), in step S1405, for each colorant set indicated by the colorant set information, the colorant amount determining unit 312 sets "1" to the colorant amount determination flag for a colorant having a residual amount less than the preset value and a device value greater than 0; whereas the colorant amount determining unit 312 sets "0" to the colorant amount determination flag for the other colorants. For example, when the preset value is 15%, the colorant amount determining unit 312 sets "1" to the colorant amount determination flag for Neon Pink of Colorant set ID 2 and to the colorant amount determination flag for Yellow of Colorant set ID 3, as presented in Tables 6-1 and 6-2.

Thereafter, in step S1406, the colorant amount determining unit 312 transmits, to the display control unit 313, the dictionary information including the colorant set information in which the colorant amount determination flag is set, the colorant mounting information, and the colorant amount information.

FIG. 13 is a diagram illustrating an edit screen generated in the DFE 102 according to the second embodiment.

In the present embodiment, the display control unit 313 acquires, from the colorant amount determining unit 312, the dictionary information, the colorant mounting information, and the colorant amount information. As illustrated in FIG. 13 the display control unit 313 includes a colorant amount X3 in the edit screen 700 according to the colorant mounting information and the colorant amount information. The colorant amount X3 represents a residual amount of each colorant mounted on the image forming apparatus 103. Note that the residual amount of a colorant may be referred to as a colorant amount. The display control unit 313 also displays, next to the colorant set selection information 703, residual amount information X4 including the name and residual amount of a colorant having a colorant amount determination flag of "1" among the colorants included in the colorant sets indicated by the colorant set information included in the dictionary information. In such a case, the display control unit 313 may display the residual amount information X4 on the edit screen 700 after step S1304 illustrated in FIG. 6.

As described above, the DFE 102 of the second embodiment allows a user to easily confirm the residual amount of a colorant included in a colorant set with which a spot color is reproduceable. Accordingly, the DFE 102 of the second embodiment allows the user to select a colorant set that does not cause a replacement of colorants.

Now, a description is given of a third embodiment.

In the present embodiment, the reproducibility of a spot color with a colorant set is displayed on the display on which the difference in the reproducibility between colorant sets is identifiable. A redundant description of like configurations of the first, second, and third embodiments is herein omitted.

In the present embodiment, the display control unit 313 includes, in an edit screen, information identifying the difference, in reproducibility (or degree of reproducibility) of a spot color, between colorant sets indicated by the colorant set information included in the dictionary information. In the present embodiment, as presented in Tables 7-1 and 7-2 below, the dictionary information includes a dictionary name, a color name, an L*a*b* value, a selected colorant set, a determination completion flag, colorant mounting information at the time of determination, a colorant set change flag, a colorant set ID, colorant set information, a determination result, and reproducibility. As described above, the reproducibility refers to a degree of reproducibility of a spot color with a colorant set. The reproducibility may be expressed in five stages, for example.

TABLE 7-1

| DICTIONARY NAME | COLOR NAME | L*A*B* VALUE | SELECTED COLORANT SET | DETERMINATION COMPLETION FLAG |
| --- | --- | --- | --- | --- |
| R COLOR BOOK COATED | VIVID RED | (74.2, 65.0, 35.9) | 2 | 1 |
| . | . | . | . | . |
| . | . | . | . | . |
| . | . | . | . | . |

TABLE 7-2

| COLORANT MOUNTING INFORMATION AT THE TIME OF DETERMINATION | COLORANT SET CHANGE FLAG | COLORANT SET ID | COLORANT SET INFORMATION | DETERMINATION RESULT | REPRODUCIBILITY |
|---|---|---|---|---|---|
| ✖ SEE TABLES 1-1 AND 1-2 | 0 | 1 | ✖ SEE ★ IN TABLES 3-1 AND 3-2 | B | 5 |
| | | 2 | ✖ SEE ★ IN TABLES 3-1 AND 3-2 | A | 4 |
| | | 3 | ✖ SEE ★ IN TABLES 3-1 AND 3-2 | A | 2 |
| . | . | . | . | . | . |
| . | . | . | . | . | . |
| . | . | . | . | . | . |

FIG. 14 is a diagram illustrating an edit screen generated in the DFE 102 according to the third embodiment.

In the present embodiment, according to the colorant mounting information and the reproducibility included in the dictionary information, the display control unit 313 displays, next to the colorant set selection information 703, reproducibility information X5 indicating a reproducibility of a spot color for each colorant by five levels, as illustrated in FIG. 14. The display control unit 313 also reflects, on the reproducibility included in the dictionary information, an actual reproducibility received from a user after an image is output For example, the display control unit 313 receives, through the edit screen displayed on the display, a selection of reproducibility of each colorant set. The display control unit 313 stores the received reproducibility as the reproducibility included in the dictionary information.

As described above, the DFE 102 according to the third embodiment allows a user to easily confirm the degree of reproducibility of a spot color with a colorant set. Accordingly, the DFE 102 of the third embodiment allows the user to easily select a colorant set to reproduce the spot color.

Now, a description is given of a fourth embodiment.

In the embodiment, a colorant set is displayed on the display together with history information of a job reproducing a spot color with the colorant set. A redundant description of like configurations of the first, second, third, and fourth embodiments is herein omitted.

Figure 15:
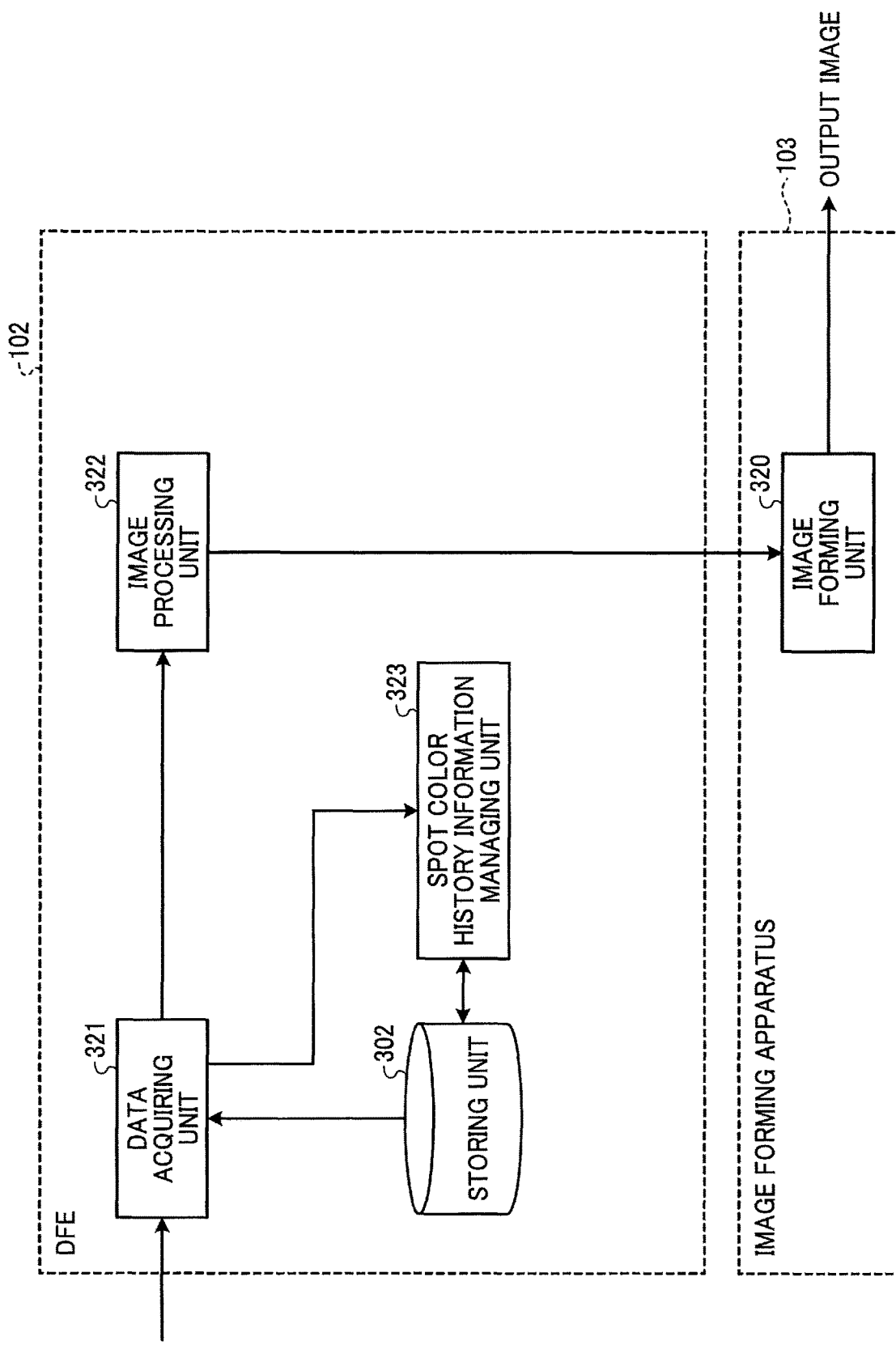
FIG. 15 is a block diagram illustrating an example of a functional configuration of a DFE and an image forming apparatus included in an information processing system according to a fourth embodiment.

Referring now to FIG. 15, a description is given of a functional configuration of the DFE 102 and the image forming apparatus 103 according to the present embodiment.

FIG. 15 is a block diagram illustrating an example of the functional configuration of the DFE 102 and the image forming apparatus 103 included in an information processing system according to the fourth embodiment.

In the present embodiment, the image forming apparatus 103 includes an image forming unit 320. The image forming unit 320 receives image data from the DFE 102 (specifically, an image processing unit 322 described later) and prints the image data.

In the present embodiment, the DFE 102 includes a data acquiring unit 321, the image processing unit 322, a spot color history information managing unit 323, and the storing unit 302.

The data acquiring unit 321 receives a print instruction from a user. According to a job ID of the print instruction thus received, the data acquiring unit 321 acquires input document data (i.e., image data) and print setting information from the storing unit 302. Then, the data acquiring unit 321 sets the input document data and the print setting information thus acquired to the spot color history information managing unit 323.

Here, the job ID is an ID identifying a job that is stored in the storing unit 302. The print setting information is information set in the input document data by the user, such as the number of pages of the input document data, the number of sheets to be printed, the sheets to be printed, color profiles, and screens. The storing unit 302 stores the input document data and the print setting information in association with the job ID.

The image processing unit 322 executes various types of image processing on the input document data, such as color conversion, total amount control, density correction, and halftone processing. Then, the image processing unit 322 transmits, to the image forming unit 320, the input document data subjected to the image processing.

The spot color history information managing unit 323 acquires, from the data acquiring unit 321, the input document data and the print setting information. In a case in which the print setting information includes a setting of color conversion of a spot color and the spot color exists in the input document data, the spot color history information managing unit 323 acquires, from the storing unit 302, the dictionary information and the history information of the spot color subject to color conversion.

The spot color history information managing unit 323 also acquires the date and time according to time information measured by a timer disposed in the DFE 102. According to the print setting information, the spot color history information managing unit 323 acquires, as history information, the name of the input document data (i.e., input document data name), the name of the spot color subject to color conversion (i.e., spot color name), and the name of a spot color to be used simultaneously (i.e., simultaneously used color). The spot color history information managing unit 323 acquires, e.g., a selected colorant set and a device value as history information from the dictionary information. The spot color history information managing unit 323 stores the acquired history information in the storing unit 302.

Here, the history information is a history information of a job of color conversion of a spot color. In the present embodiment, as presented in Tables 8-1 and 8-2 below, the history information includes, e.g., the date (and time) when a color having a color name included in the dictionary information is used in printing, the name of the input document data printed, the selected colorant set, the device value, and the simultaneously used color. Here, the simultaneously used color refers to a plurality of colors converted into a plurality of spot colors and printed when the input document data includes the plurality of spot colors. The simultaneously used color is information that helps a user to understand what colors to confirm at the same time when the user re-outputs the input document data that has been output or when the user adjusts colors of, e.g., a company logo in a plurality of spot colors.

TABLE 8-1

| DICTIONARY NAME | COLOR NAME | DATE | INPUT DOCUMENT DATA NAME |
|---|---|---|---|
| R COLOR BOOK COATED | VIVID RED | 2021 Jan. 30 | GREETINGS_W_V2.PDF |
| | | 2021 Jan. 19 | 5KDHS0001.PDF |
| | | 2020 Dec. 14 | GREETINGS_W_V1.PDF |
| . | . | . | . |
| . | . | . | . |
| . | . | . | . |

TABLE 8-2

| SELECTED COLORANT SET | DEVICE VALUE | SIMULTANEOUSLY USED COLOR |
|---|---|---|
| KCMYNP | 0, 0, 45, 0, 60 | R VIVID PINK, R PURPLE |
| KCMYR | 0, 13, 0, 0, 70 | — |
| KCMYNP | 0, 0, 45, 0, 60 | R VIVID PINK, R PURPLE |
| . | . | . |
| . | . | . |
| . | . | . |

FIG. 16 is a diagram illustrating an edit screen generated in the DFE 102 according to the fourth embodiment.

In the present embodiment, the display control unit 313 displays, on the display, the colorant set indicated by the colorant set information and the history information acquired by the spot color history information managing unit 323 Specifically, as illustrated in FIG. 16, the display control unit 313 generates the edit screen 700 including history information X6. For example, after step S1304 illustrated in FIG. 6, the display control unit 313 may acquire the history information X6 from the storing unit 302 and display, on the edit screen 700, the history information X6 thus acquired. The display control unit 313 may generate the edit screen 700 including the history information X6 that includes a plurality of histories as illustrated in FIG. 16. Optionally, the display control unit 313 may set a display portion of the history information X6 as an input window to allow, e.g., a user to edit the history information X6 through the input window.

Figure 17:
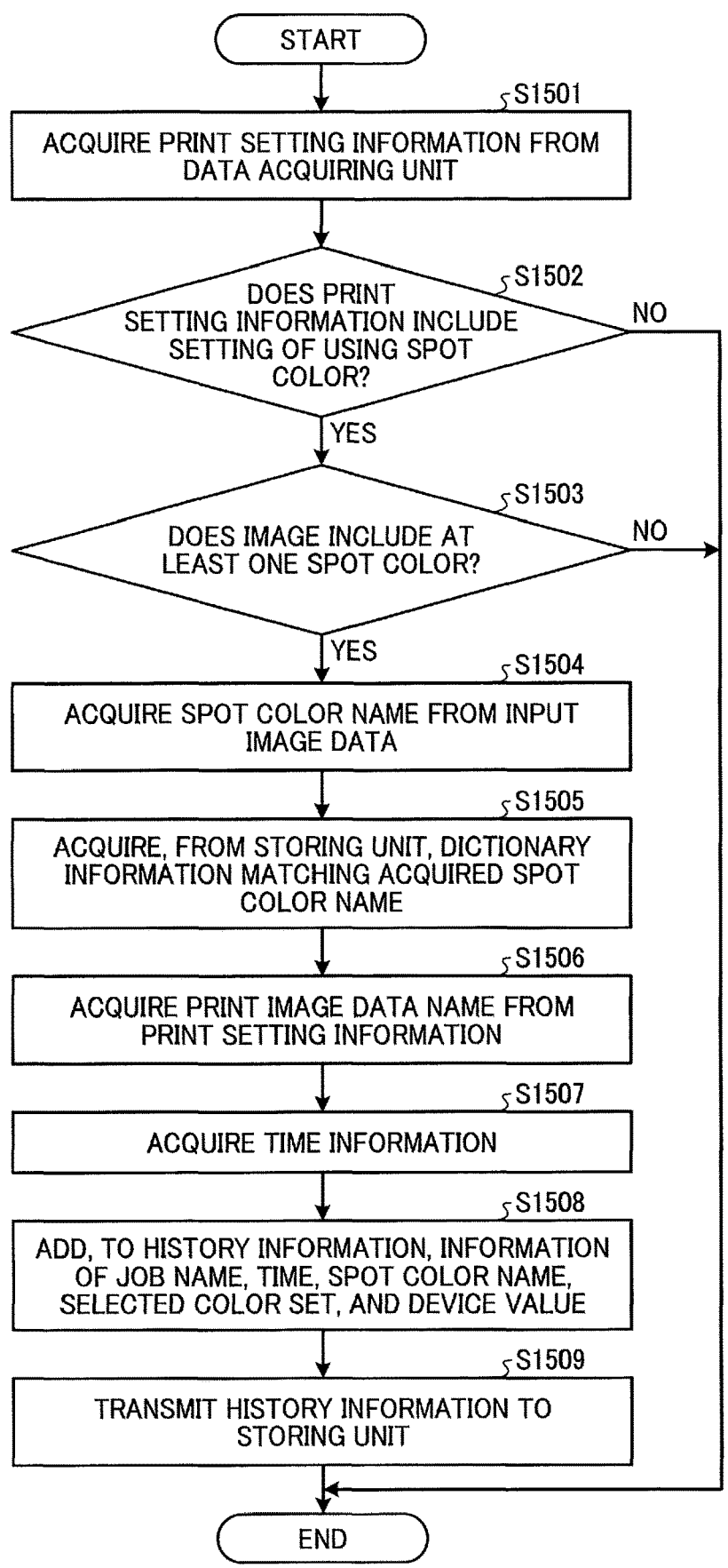
FIG. 17 is a flowchart illustrating an example of a process executed by a spot color history information managing unit included in the DFE according to the fourth embodiment.

Referring now to FIG. 17, a description is given of a process executed by the spot color history information managing unit 323.

FIG. 17 is a flowchart illustrating an example of the process executed by the spot color history information managing unit 323 included in the DFE 102 according to the fourth embodiment.

In step S1501, the spot color history information managing unit 323 acquires print setting information from the data acquiring unit 321.

Subsequently, in step S1502, the spot color history information managing unit 323 determines whether the print setting information includes a setting of color conversion of a spot color.

When the print setting information does not include the setting of color conversion of a spot color (NO in step 1502), the spot color history information managing unit 323 ends the process illustrated in FIG. 17.

By contrast, when the print setting information includes the setting of color conversion of a spot color (YES in step 1502), in step S1503, the spot color history information managing unit 323 determines whether input document data (i.e., an image) includes at least one spot color.

When the input document data includes no spot color (NO in step 1503), the spot color history information managing unit 323 ends the process illustrated in FIG. 17.

By contrast; when the input document data includes at least one spot color (YES in step 1503), in step S1504, the spot color history information managing unit 323 acquires a spot color name from the input document data.

In step S1505, the spot color history information managing unit 323 acquires, from the storing unit 302, the dictionary information of the acquired spot color name.

In step S1506, the spot color history information managing unit 323 acquires an input document (i.e., print image) data name from the print setting information.

In step S1507, the spot color history information managing unit 323 acquires time information from the timer disposed in the DFE 102.

Subsequently, in step S1508, the spot color history information managing unit 323 adds, to history information, e.g., the input document data name, the time information, the spot color name, a selected colorant set, and a device value.

In step S1509, the spot color history information managing unit 323 stores the history information in the storing unit 302.

As described above, the DFE 102 of the fourth embodiment allows, e.g., a user to select a colorant set that is used to reproduce a spot color while viewing the history information of jobs of color conversion of the spot color. Accordingly, the DFE 102 of the fourth embodiment facilitates reflection of an intention of the user on the colorant set that is used to reproduce the spot color.

Programs executed by the DFE 102 according to the embodiments and variations of the present disclosure are stored in, e.g., the ROM 202 in advance, thus being providable. The programs executed by the DFE 102 according to the embodiments and variations of the present disclosure may be recorded in a computer-readable recording medium in an installable or executable file format and provided. Examples of the computer-readable recording medium include, but are not limited to, a compact disc read-only memory (CD-ROM), a flexible disk (FD), a compact disc-recordable (CD-R), and a digital versatile disk (DVD).

Alternatively, the programs executed by the DFE 102 according to the embodiments and variations of the present disclosure may be stored on a computer connected to a network such as the Internet and downloaded via the network to be provided. The programs executed by the DFE 102 according to the embodiments and variations of the present disclosure may be provided or distributed via a network such as the Internet.

The programs executed by the DFE 102 according to the embodiments and variations of the present disclosure has a module configuration including the functional units described above (namely, the colorant information acquiring unit 301, the spot color information managing unit 303, the colorant set determining unit 304, and the display control unit 305). As actual hardware, the CPU 201 (serving as a processor) reads a program from the ROM 202 and executes the program, thus loading and generating the functional units described above (namely, the colorant information acquiring unit 301, the spot color information managing unit 303, the colorant set determining unit 304, and the display control unit 305) on a main storage device.

In the embodiments and variation described above, the image processing apparatus is applied to a multifunction peripheral (MFP) having at least two of copying, printing, scanning, and facsimile functions. Alternatively, the image processing apparatus may be applied to any image forming apparatus such as a copier, a printer, a scanner, or a facsimile machine.

The embodiments of the present disclosure allow execution of an operation equivalent to determining a priority order of colorant sets that are used to reproduce a spot color, while facilitating identification of a colorant to be replaced to reproduce a certain spot color, thus reducing time and effort that a user needs to consider the replacement of the colorant.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An image processing apparatus comprising circuitry configured to:
   acquire, for a spot color that is reproduced with at least one of a process color colorant and a colorant different from the process color colorant, colorant set information indicating at least one colorant set that reproduces the spot color;
   classify, according to colorant mounting information indicating a colorant mounted on an image forming apparatus, the at least one colorant set into a first colorant set and a second colorant set, the first colorant set being a colorant set with which the spot color is reproduceable without a replacement of the colorant mounted on the image forming apparatus, the second colorant set being a colorant set with which the spot color is reproduceable with a replacement of the colorant mounted on the image forming apparatus;
   display the at least one colorant set on a display on which the at least one colorant set is identifiable as one of the first colorant set and the second colorant set; and
   receive a selection of the first colorant set that is used to reproduce the spot color.

2. The image processing apparatus according to claim 1, wherein the circuitry is configured to display the first colorant set as being selectable and the second colorant set as being non-selectable.

3. The image processing apparatus according to claim 1, wherein the circuitry is configured to update the display on which the at least one colorant set is identifiable as one of the first colorant set and the second colorant set, in response to the replacement of the colorant mounted on the image forming apparatus.

4. The image processing apparatus according to claim 1, further comprising a storage device configured to store colorant amount information indicating a residual amount of one of the colorant mounted on the image forming apparatus and a colorant having been mounted on the image forming apparatus at least once,
   wherein the circuitry is configured, according to the colorant amount information and the colorant set information, to determine whether a colorant that is used to reproduce the spot color having a residual amount equal to or greater than a given amount, and
   wherein the circuitry is configured to display, on the display, information identifying a colorant set, of the at least one colorant set, including the colorant that is used to reproduce the spot color having a residual amount less than the given amount.

5. The image processing apparatus according to claim 4, wherein the circuitry is configured to display, on the display, the residual amount of the colorant mounted on the image forming apparatus, according to the colorant amount information.

6. The image processing apparatus according to claim 1, wherein the circuitry is configured to display reproducibility of the spot color with the at least one colorant set on the display on which a difference in the reproducibility between colorant sets of the at least one colorant set is identifiable.

7. The image processing apparatus according to claim 1, wherein the circuitry is configured to acquire history information of a job of color conversion of the spot color, and
   wherein the circuitry is configured to display, on the display, the history information together with the at least one colorant set.

8. An image processing method comprising:
   acquiring, for a spot color that is reproduced with at least one of a process color colorant and a colorant different from the process color colorant, colorant set information indicating at least one colorant set that reproduces the spot color;
   classifying, according to colorant mounting information indicating a colorant mounted on an image forming apparatus, the at least one colorant set into a first colorant set and a second colorant set, the first colorant set being a colorant set with which the spot color is reproduceable without a replacement of the colorant mounted on the image forming apparatus, the second colorant set being a colorant set with which the spot color is reproduceable with a replacement of the colorant mounted on the image forming apparatus;

displaying the at least one colorant set on a display on which the at least one colorant set is identifiable as one of the first colorant set and the second colorant set; and receiving a selection of the first colorant set that is used to reproduce the spot color.

9. A non-transitory, computer-readable storage medium storing computer-readable program code that causes a computer to execute an image processing method, the method comprising:

acquiring, for a spot color that is reproduced with at least one of a process color colorant and a colorant different from the process color colorant, colorant set information indicating at least one colorant set that reproduces the spot color;

classifying, according to colorant mounting information indicating a colorant mounted on an image forming apparatus, the at least one colorant set into a first colorant set and a second colorant set, the first colorant set being a colorant set with which the spot color is reproduceable without a replacement of the colorant mounted on the image forming apparatus, the second colorant set being a colorant set with which the spot color is reproduceable with a replacement of the colorant mounted on the image forming apparatus;

displaying the at least one colorant set on a display on which the at least one colorant set is identifiable as one of the first colorant set and the second colorant set; and receiving a selection of the first colorant set that is used to reproduce the spot color.

* * * * *